(12) United States Patent
Lo et al.

(10) Patent No.: US 12,542,570 B2
(45) Date of Patent: Feb. 3, 2026

(54) POWER AMPLIFIER-AWARE MODULATION

(71) Applicant: Samsung Electronics Co., Ltd., Suwon-si (KR)

(72) Inventors: Caleb K. Lo, San Jose, CA (US); Joonyoung Cho, Portland, OR (US); Jianzhong Zhang, Dallas, TX (US); Chance Anthony Tarver, Arlington, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 18/444,385

(22) Filed: Feb. 16, 2024

(65) Prior Publication Data
US 2025/0007544 A1    Jan. 2, 2025

Related U.S. Application Data

(60) Provisional application No. 63/524,472, filed on Jun. 30, 2023.

(51) Int. Cl.
*H04B 1/04* (2006.01)
*H04L 27/04* (2006.01)

(52) U.S. Cl.
CPC ........... *H04B 1/0475* (2013.01); *H04L 27/04* (2013.01); *H04B 2001/0425* (2013.01)

(58) Field of Classification Search
CPC .......... H04B 1/0475; H04B 2001/0425; H04L 27/04

(Continued)

(56) References Cited

U.S. PATENT DOCUMENTS

| 6,252,912 B1* | 6/2001 | Salinger | H04L 27/34 375/285 |
| 6,785,342 B1* | 8/2004 | Isaksen | H04L 27/34 375/284 |

(Continued)

FOREIGN PATENT DOCUMENTS

| CN | 105978501 A | 9/2016 |
| CN | 113054917 A | 6/2021 |

OTHER PUBLICATIONS

International Search Report and Written Opinion issued Sep. 30, 2024 regarding International Application No. PCT/KR2024/008305, 7 pages.

(Continued)

*Primary Examiner* — Emmanuel Bayard

(57) ABSTRACT

Methods and apparatuses for dynamically adjusting parameters of a modulation scheme and parameters of a digital pre-distorter (DPD) to pre-compensate for distortion effects of a power amplifier (PA). A user equipment (UE) comprises a modulator configured to generate modulation symbols from input bits according to an adjusted symbol constellation, a DPD operably configured to generate pre-distorted symbols, and a PA configured to amplify the pre-distorted symbols to generate transmission symbols that include distortion effects of the PA. The adjusted symbol constellation is adjusted from a target symbol constellation such that the generated modulation symbols pre-compensate for the distortion effects. The DPD is further configured to generate the pre-distorted symbols from the modulation symbols using a pre-distortion function to further pre-compensate for the distortion effects, and update the pre-distortion function such that a difference between the transmission symbols and a scaled version of the target symbol constellation is reduced.

20 Claims, 39 Drawing Sheets

(58) Field of Classification Search
USPC .................................................. 375/295–297
See application file for complete search history.

(56) References Cited

U.S. PATENT DOCUMENTS

| | | | |
|---|---|---|---|
| 8,489,042 B1* | 7/2013 | Hietala | H03F 1/3247 |
| | | | 455/114.3 |
| 9,520,907 B2 | 12/2016 | Peng et al. | |
| 9,680,434 B2 | 6/2017 | Yan et al. | |
| 9,973,370 B1 | 5/2018 | Langer et al. | |
| 9,998,241 B2* | 6/2018 | Tsai | H04B 17/13 |
| 10,148,296 B2 | 12/2018 | Matsuura et al. | |
| 11,025,458 B2 | 6/2021 | Khlat | |
| 11,431,297 B2 | 8/2022 | Khlat | |
| 11,502,760 B2 | 11/2022 | Cho et al. | |
| 2005/0243946 A1* | 11/2005 | Chung | H03F 1/3247 |
| | | | 375/297 |
| 2008/0112506 A1* | 5/2008 | Strong | H04L 5/1469 |
| | | | 375/300 |
| 2008/0187035 A1 | 8/2008 | Nakamura et al. | |
| 2010/0233977 A1 | 9/2010 | Minnis et al. | |
| 2017/0201315 A1* | 7/2017 | Avellan | H04W 52/18 |
| 2018/0092047 A1* | 3/2018 | Merlin | H04W 52/241 |
| 2019/0132015 A1 | 5/2019 | Lozhkin et al. | |
| 2021/0203369 A1 | 7/2021 | Kasargod et al. | |
| 2023/0006611 A1 | 1/2023 | Chen et al. | |
| 2023/0387866 A1* | 11/2023 | Drogi | H03F 3/195 |
| 2024/0184846 A1* | 6/2024 | John | G06F 17/16 |

OTHER PUBLICATIONS

"5G; NR; Physical channels and modulation (3GPP TS 38.211 version 17.5.0 Release 17)", ETSI TS 138 211 V17.5.0, Jul. 2023, 141 pages.

"3rd Generation Partnership Project; Technical Specification Group Radio Access Network; NR; Radio Resource Control (RRC) protocol specification (Release 17)", 3GPP TS 38.331 V17.4.0, Mar. 2023, 1321 pages.

"3rd Generation Partnership Project; Technical Specification Group Radio Access Network; NR; Medium Access Control (MAC) protocol specification (Release 17)", 3GPP TS 38.321 V17.4.0, Mar. 2023, 252 pages.

"5G; NR; Physical layer procedures for data (3GPP TS 38.214 version 17.6.0 Release 17)", ETSI TS 138 214 V17.6.0, Jul. 2023, 236 pages.

Morgan, D., et al., "A Generalized Memory Polynomial Model for Digital Predistortion of RF Power Amplifiers", IEEE Transactions on Signal Processing, vol. 54, No. 10, Oct. 2006, 9 pages.

Eun, C., et al., "A New Volterra Predistorter Based on the Indirect Learning Architecture", IEEE Transactions on Signal Processing, vol. 45, No. 1, Jan. 1997, 5 pages.

Park, J., et al., "Joint Optimization of Data Predistortion and Baseband Pulse Shaping in High Speed Transmission Nonlinear Systems", IEEE International Conference on Microwaves, Communications, Antennas and Electronics Systems, Nov. 2009, 6 pages.

Buckwalter, J., "Envelope Tracking PA", downloaded Jan. 25, 2024, 17 pages. https://web.ece.ucsb.edu/Faculty/rodwell/Classes/ece218c/notes/Lecture13_EnvelopeTracking.pdf.

PyTorch, "MSELOSS," PyTorch Documentation Library, Torch. NN, 2023, 2 pages.

PyTorch, "BCELOSS," PyTorch Documentation Library, Torch. NN, 2023, 2 pages.

PyTorch, "L1LOSS," PyTorch Documentation Library, Torch.NN, 2023, 2 pages.

PyTorch, "LINEAR," PyTorch Documentation Library, Torch. NN, 2023, 2 pages.

PyTorch, "ELU," PyTorch Documentation Library, Torch.NN, 2023, 2 pages.

PyTorch, "BATCHNORM1D," PyTorch Documentation Library, Torch.NN, 2023, 2 pages.

\* cited by examiner

1952

1950

2052

2050

```
PDSCH-ServingCellConfig ::= SEQUENCE {
    mtch-Fibrearelation     SEQUENCE {
        sibEnabled              BOOLEAN
        sibtiming               INTEGER (1..8)
        sibases                 SEQUENCE (SIZE (1..maxBEs)) of sifraingarams OPTIONAL, -- Need R
    }
}
```
— 4200

FIG. 42

POWER AMPLIFIER-AWARE MODULATION

CROSS-REFERENCE TO RELATED APPLICATION AND CLAIM OF PRIORITY

This application claims priority under 35 U.S.C. § 119(e) to U.S. Provisional Patent Application No. 63/524,472 filed on Jun. 30, 2023, which is hereby incorporated by reference in its entirety.

TECHNICAL FIELD

This disclosure relates generally to symbol generation in wireless communications systems. Embodiments of this disclosure relate to methods and apparatuses for dynamically adjusting parameters of a modulation scheme and parameters of a pre-distorter to pre-compensate for distortion effects of a power amplifier.

BACKGROUND

In wireless communication systems, data bits to be transmitted are encoded, and the encoded bits are modulated according to a modulation method such as quadrature amplitude modulation (QAM). This modulation method yields symbols that are subject to additional transmit-side processing. These processed symbols are eventually amplified by a power amplifier (PA) before over-the-air (OTA) transmission. PA amplification combats signal impairments such as path loss and receive-side additive noise.

PA amplification introduces additional signal impairments, however. For example, the input-output PA characteristic has both a linear region (where output power scales linearly with input power) and a nonlinear region (where output power saturates with input power). Thus, modulation symbols that differ in amplitude may not be uniformly scaled by a PA. Additionally, the input-output PA characteristic exhibits memory effects, where the output at a given time instant is a function of modulation symbols input at previous time instants. Thus, the PA output may be "smeared" around a given modulation symbol, where the amount of "smearing" depends on the memory effects.

SUMMARY

Embodiments of the present disclosure provide methods and apparatuses facilitating symbol modulation that accounts for distortion introduced by a PA in a wireless transmission device.

In one embodiment, a user equipment (UE) comprises a modulator configured to generate modulation symbols from input bits according to an adjusted symbol constellation, a DPD operably coupled to the modulator and configured to generate pre-distorted symbols, and a PA operably coupled to the DPD and configured to amplify the pre-distorted symbols to generate transmission symbols that include distortion effects of the PA. The adjusted symbol constellation is adjusted from a target symbol constellation such that the generated modulation symbols pre-compensate for the distortion effects. The DPD is further configured to generate the pre-distorted symbols from the modulation symbols using a pre-distortion function to further pre-compensate for the distortion effects, and update the pre-distortion function such that a difference between the transmission symbols and a scaled version of the target symbol constellation is reduced.

In another embodiment, a base station (BS) comprises a modulator configured to generate modulation symbols from input bits according to an adjusted symbol constellation, a DPD operably coupled to the modulator and configured to generate pre-distorted symbols, and a PA operably coupled to the DPD and configured to amplify the pre-distorted symbols to generate transmission symbols that include distortion effects of the PA. The adjusted symbol constellation is adjusted from a target symbol constellation such that the generated modulation symbols pre-compensate for the distortion effects. The DPD is further configured to generate the pre-distorted symbols from the modulation symbols using a pre-distortion function to further pre-compensate for the distortion effects, and update the pre-distortion function such that a difference between the transmission symbols and a scaled version of the target symbol constellation is reduced.

In another embodiment, a method of operation of a UE comprises the steps of generating modulation symbols from input bits according to an adjusted symbol constellation, generating pre-distorted symbols from the modulation symbols, and amplifying the pre-distorted symbols using a PA to generate transmission symbols that include distortion effects of the PA. The adjusted symbol constellation is adjusted from a target symbol constellation such that the generated modulation symbols pre-compensate for the distortion effects, and the pre-distorted symbols are generated from the modulation symbols using a pre-distortion function to further pre-compensate for the distortion effects. The method further comprises the step of updating the pre-distortion function such that a difference between the transmission symbols and a scaled version of the target symbol constellation is reduced.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following abbreviations may be referred to herein:
ACLR (Adjacent Channel Leakage Ratio)
AI (Artificial Intelligence)
BCE (Binary Cross Entropy)
BN (Batch Normalization)
BS (Base Station)
CE (Control Element)
CSI (Channel State Information)
dBm (decibels per milliwatt)
DC (Direct Current)
DCI (Downlink Control Information)
DL (Downlink)
DPD (Digital Pre-Distortion)
ELU (Exponential Linear Unit)
ET (Envelope Tracking)
GMP (Generalized Memory Polynomial)
IE (Information Element)
ILA (Indirect Learning Architecture)
LS (Least Squares)
MCS (Modulation and Coding Scheme)
ML (Machine Learning)
NMSE (Normalized Mean Square Error)
OTA (Over-the-Air)
PA (Power Amplifier)
PDCCH (Physical Downlink Control Channel)
PDSCH (Physical Downlink Shared Channel)
PSD (Power Spectral Density)
PUCCH (Physical Uplink Control Channel)
PUSCH (Physical Uplink Shared Channel)
QAM (Quadrature Amplitude Modulation)
RC (Raised Cosine)
RRC (Radio Resource Control)
SER (Symbol Error Rate)
UCI (Uplink Control Information)
UE (User Equipment)

Definitions for other certain words and phrases are provided throughout this patent document. Those of ordinary skill in the art should understand that in many if not most instances, such definitions apply to prior as well as future uses of such defined words and phrases.

The following documents are incorporated by reference herein in their entirety:

[1] 3GPP, TS 38.211, 5G; NR; Physical channels and modulation
[2] 3GPP, TS 38.331, 5G; NR; Radio Resource Control (RRC); Protocol specification
[3] 3GPP, TS 38.321, 5G; NR; Medium Access Control (MAC); Protocol specification
[4] 3GPP, TS 38.214, 5G; NR; Physical layer procedures for data
[5] D.R. Morgan, Z. Ma, J. Kim, M. G. Zierdt, and J. Pastalan, "A Generalized Memory Polynomial Model for Digital Predistortion of RF Power Amplifiers", IEEE Transactions on Signal Processing, vol. 54, no. 10, pp. 3852-3860 October 2006.
[6] C. Eun and E. J. Powers, "A New Volterra Predistorter Based on the Indirect Learning Architecture", IEEE Transactions on Signal Processing, vol. 45, no. 1, pp. 223-227, January 1997.
[7] J. S. Park, S. B. Gelfand, and M. P. Fitz, "Joint Optimization of Data Predistortion and Baseband Pulse Shaping in High Speed Transmission Nonlinear Systems", IEEE International Conference on Microwaves, Communications, Antennas and Electronics Systems, pp. 1-6, November 2009.
[8] Buckwalter, J. (2016). *Envelope Tracking PA* [PDF slides]. Department of Electrical and Computer Engineering, University of California at Santa Barbara. https://web.ece.ucsb.edu/Faculty/rodwell/Classes/ece218c/notes/Lecture13_EnvelopeTracking.pdf

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 42 illustrates an example modified PDSCH-Serving-CellConfig IE according to embodiments of the present disclosure.

DETAILED DESCRIPTION

FIGS. 1 through 43, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that the performance of conventional modulation methods is impaired by distortion effects caused by PA amplification due to the input-output PA characteristic.

Accordingly, embodiments of the present disclosure provide implementation details of modulation methods that account for the input-output PA characteristic. For example, considering the standard 16-QAM constellation, if the four outermost modulation symbols (i.e., the corner symbols) lie in the nonlinear region of the PA characteristic, while the other twelve modulation symbols lie in the linear region of the PA characteristic, then the constellation can be modified by applying a pre-scaling factor to only the four outermost modulation symbols. This pre-scaling factor can be chosen such that at the PA output, all sixteen modulation symbols have been uniformly scaled. Some corresponding signaling details of these methods are also discussed in this disclosure.

Figure 1:
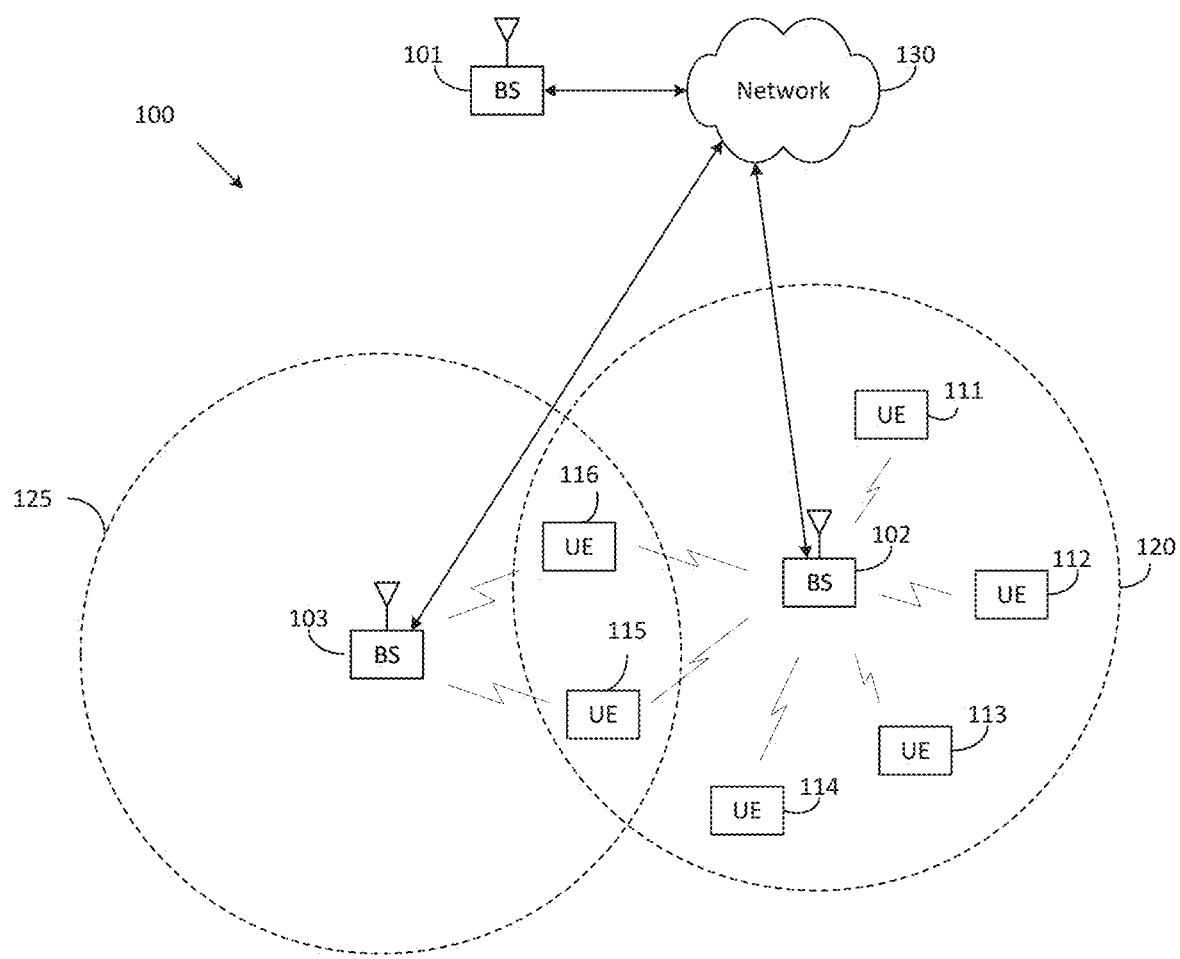
FIG. 1 illustrates an example wireless network according to various embodiments of the present disclosure.
Figure 2:
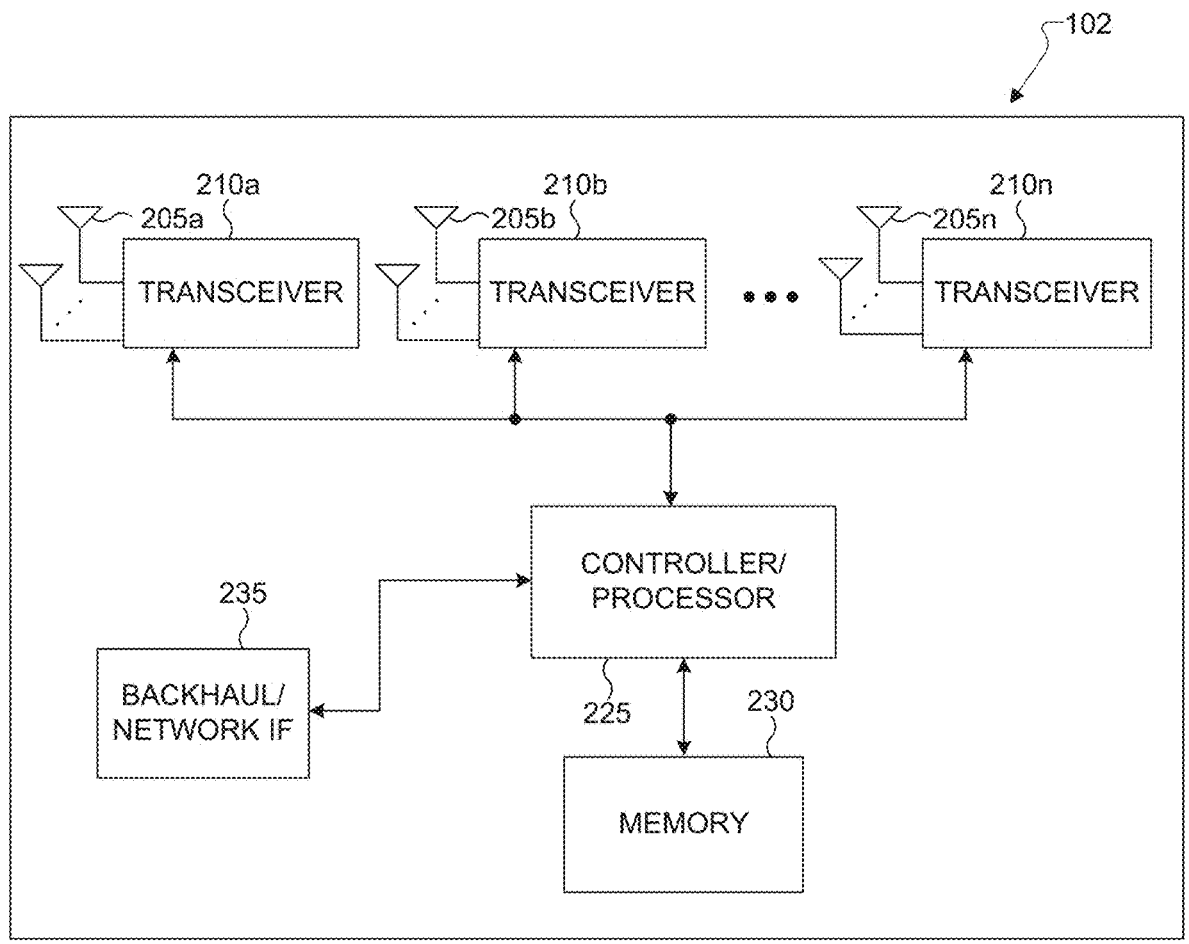
FIG. 2 illustrates an example gNB according to embodiments of the present disclosure.
Figure 3:
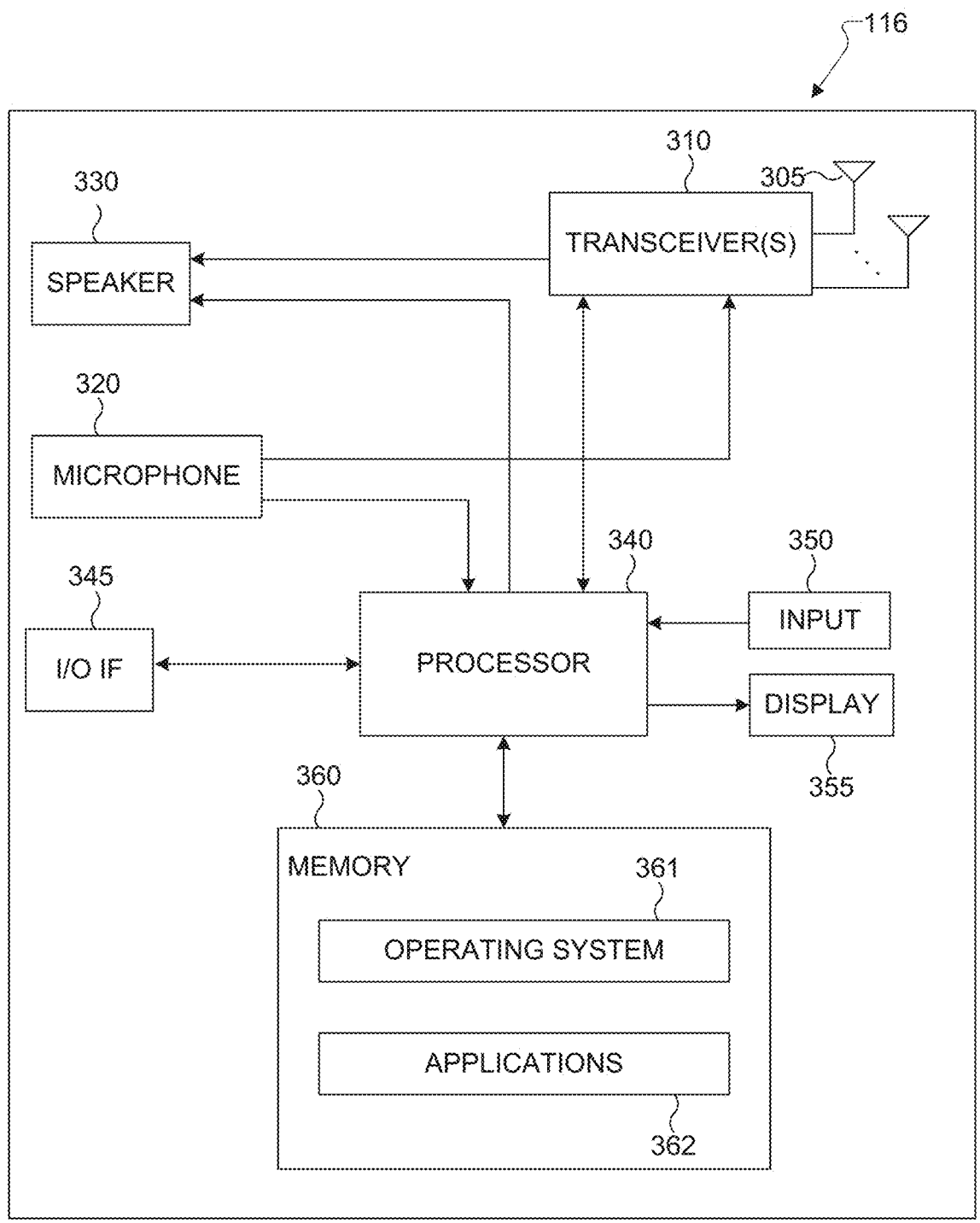
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n. In some embodiments, the transceivers 210a-210n each include an adjusted modulator, DPD, ET, and PA that facilitate symbol modulation that accounts for distortion introduced by the PA, as discussed further below.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305. In some embodiments, the TX processing circuitry in the transceivers(s) 310 include an adjusted modulator, DPD, ET, and PA that facilitate symbol modulation that accounts for distortion introduced by the PA, as discussed further below.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

As discussed herein above, when digital information bits are prepared for transmission in a wireless system (e.g., a gNB 102 or UE 116) they are encoded, the encoded bits are modulated to generate symbols, and the symbols are further processed before being amplified by a PA for transmission. PA amplification pre-compensates for path loss and additive noise at the receiver to ensure that the message can be received. This comes at the cost of introducing distortion effects that are inherent to the PA, however. A PA may introduce both nonlinear effects and memory effects that impact the modulation symbols input to the PA, resulting in distorted transmission symbols that may be erroneously demodulated at the receiver.

Figure 4:
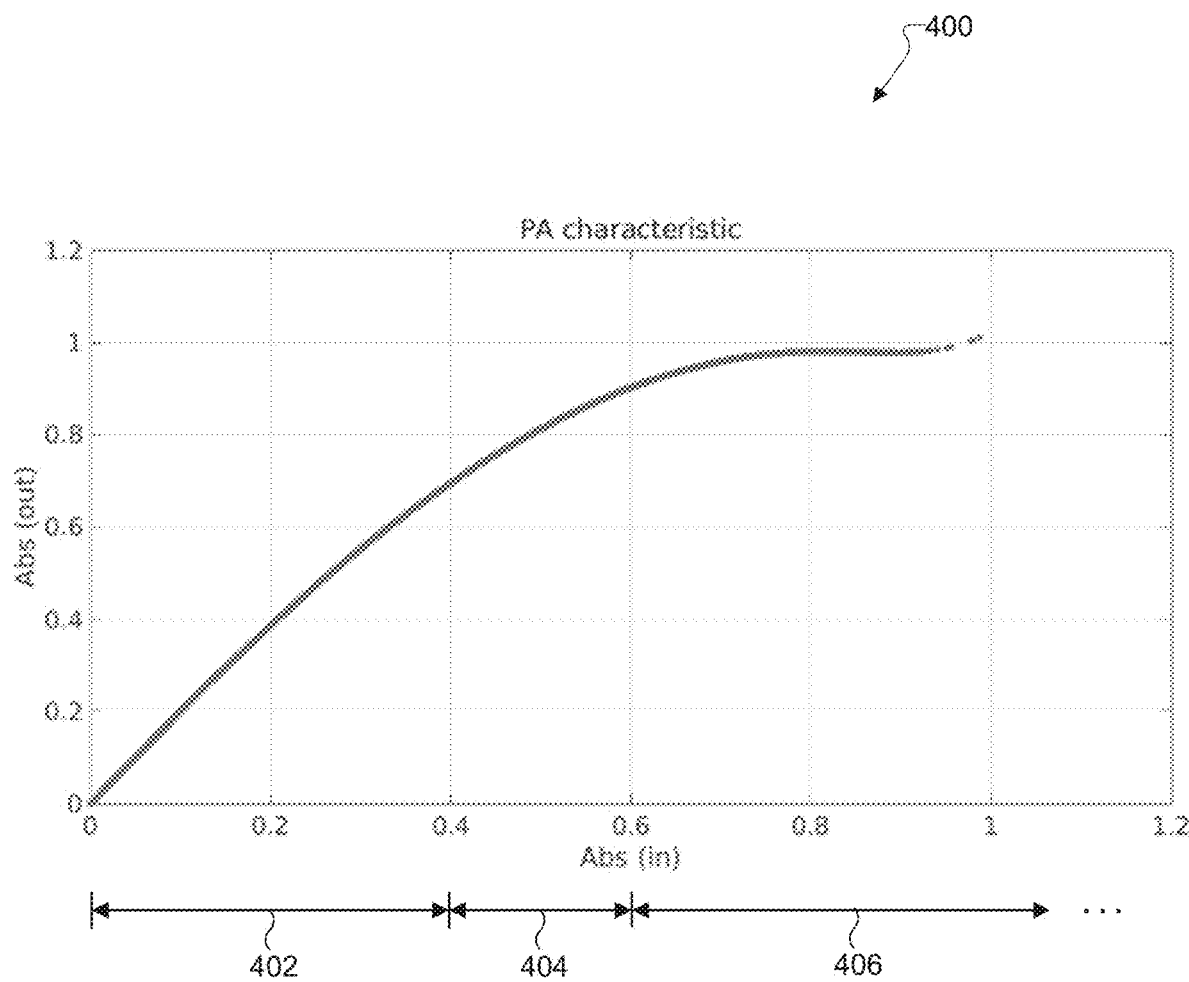
FIG. 4 illustrates an example input-output PA characteristic according to embodiments of the present disclosure.

FIG. 4 illustrates an example input-output PA characteristic 400 according to embodiments of the present disclosure. The example PA characteristic 400 can be divided into roughly three regions: Region 1 (402) with input amplitudes between 0 and 0.4, where the PA output scales almost linearly with the input, Region 2 (404) with input amplitudes between 0.4 and 0.6, where the PA output scales almost linearly with the input, though the slope has decreased from that of Region 1, and Region 3 (406) with input amplitudes above 0.6, where the PA output scales nonlinearly with the input—in fact, for input amplitudes above 0.8, the PA output has effectively saturated. The nonlinear distortion in the example PA characteristic 400 motivates the application of modulation methods that account for it.

Figure 5:
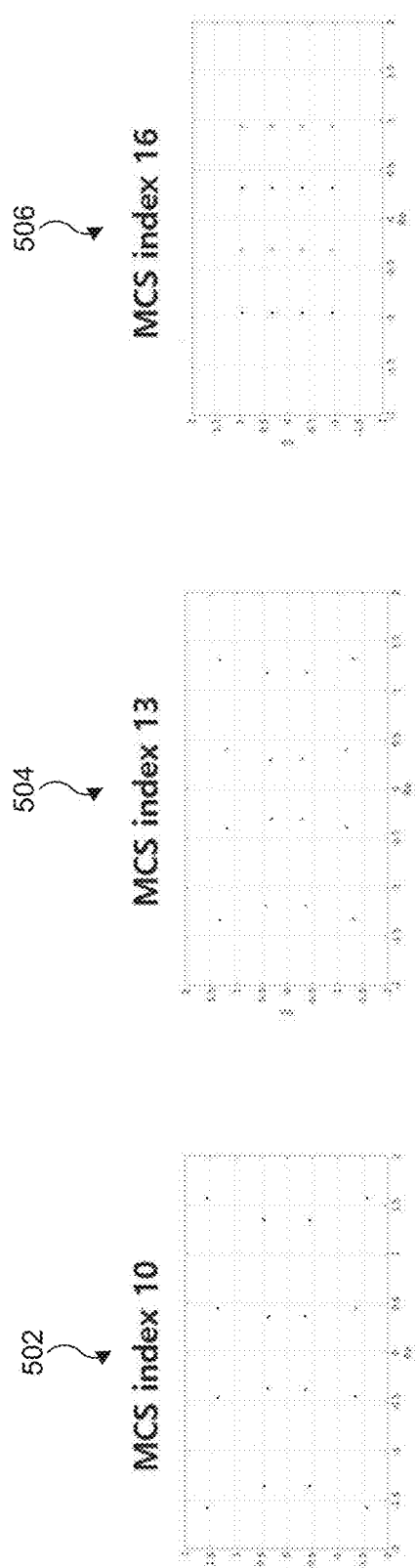
FIG. 5 illustrates an example of modulation symbol constellations according to embodiments of the present disclosure.

FIG. 5 illustrates an example of modulation symbol constellations according to embodiments of the present disclosure. The three constellations in FIG. 5 are considered for use with a PA having the PA characteristic 400 of FIG. 4. Additionally, the constellations in FIG. 5 are mapped to different MCS indices. Assuming that all sixteen modulation symbols in the rightmost constellation 506 lie in Region 1 (402) of the PA characteristic 400, this PA will apply a uniform scaling to this constellation. If the four outermost symbols in the rightmost constellation 506 lie in Region 3 (406) of the PA characteristic 400, though, then this PA will not apply a uniform scaling to this constellation. By contrast, the non-uniform spacing that can be observed in the middle constellation 504 and the leftmost constellation 502 can be viewed as pre-scaling of the outermost (and, in this case, the middle) modulation symbols before PA amplification. When modulation symbols from these constellations are applied at the corresponding target PA operating points, the constellations of the transmission symbols at the PA output are almost square (e.g., the constellation 2050 on the right of FIG. 20, discussed below).

FIG. 5 also highlights a PA-aware modification of the conventional approach for determining a modulation method. For example, Table 5.1.3.1-1 in [4] shows that modulation and coding scheme (MCS) indices 10-16 all map to one modulation method, i.e., 16-QAM. FIG. 5 illustrates that this approach can be modified to support different constellations depending on MCS index for a given modulation order, which can compensate for nonlinear distortion. Amplifying each of the constellations in FIG. 5 using a given PA could yield a different output constellation—and a different spectral efficiency—even if one code rate is used for MCS indices 10-16.

Figure 6:
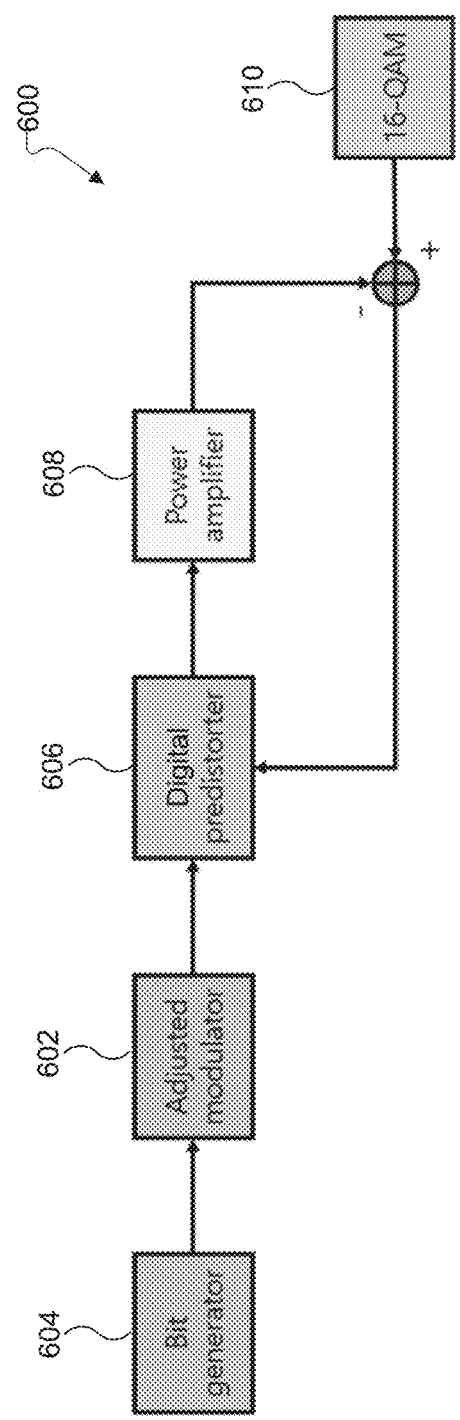
FIG. 6 illustrates an example wireless transmitter (Tx) system with joint operation of adjusted modulation and digital pre-distortion (DPD) according to embodiments of the present disclosure.

FIG. 6 illustrates an example wireless transmitter (Tx) system 600 with joint operation of adjusted modulation and digital pre-distortion (DPD) according to embodiments of the present disclosure. The example of FIG. 6 may be implemented in, for example, the transceiver of a gNB 102 or a UE 116. In this example, the adjusted modulator 602 corresponds to a modulation method that utilizes a constellation such as one of the constellations in FIG. 5. This modulation method generates modulation symbols from encoded bits received from the bit generator 604, and the modulation symbols are then passed to the DPD 606. For this system, the DPD 606 can be trained to reduce (and preferably to minimize) the difference between the output of the PA 608 and an appropriately scaled version of a target constellation 610, such as 16-QAM. The scaling factor that is applied to a target constellation such as 16-QAM is chosen to facilitate convergence of the DPD training process.

In some embodiments, which are discussed further below, the current PA operating point can be passed as an input to the adjusted modulator 602. The adjusted modulator 602 can then use the current PA operating point to determine a modulation method. This modulation method then generates modulation symbols that are passed to the DPD 606.

Figure 7:
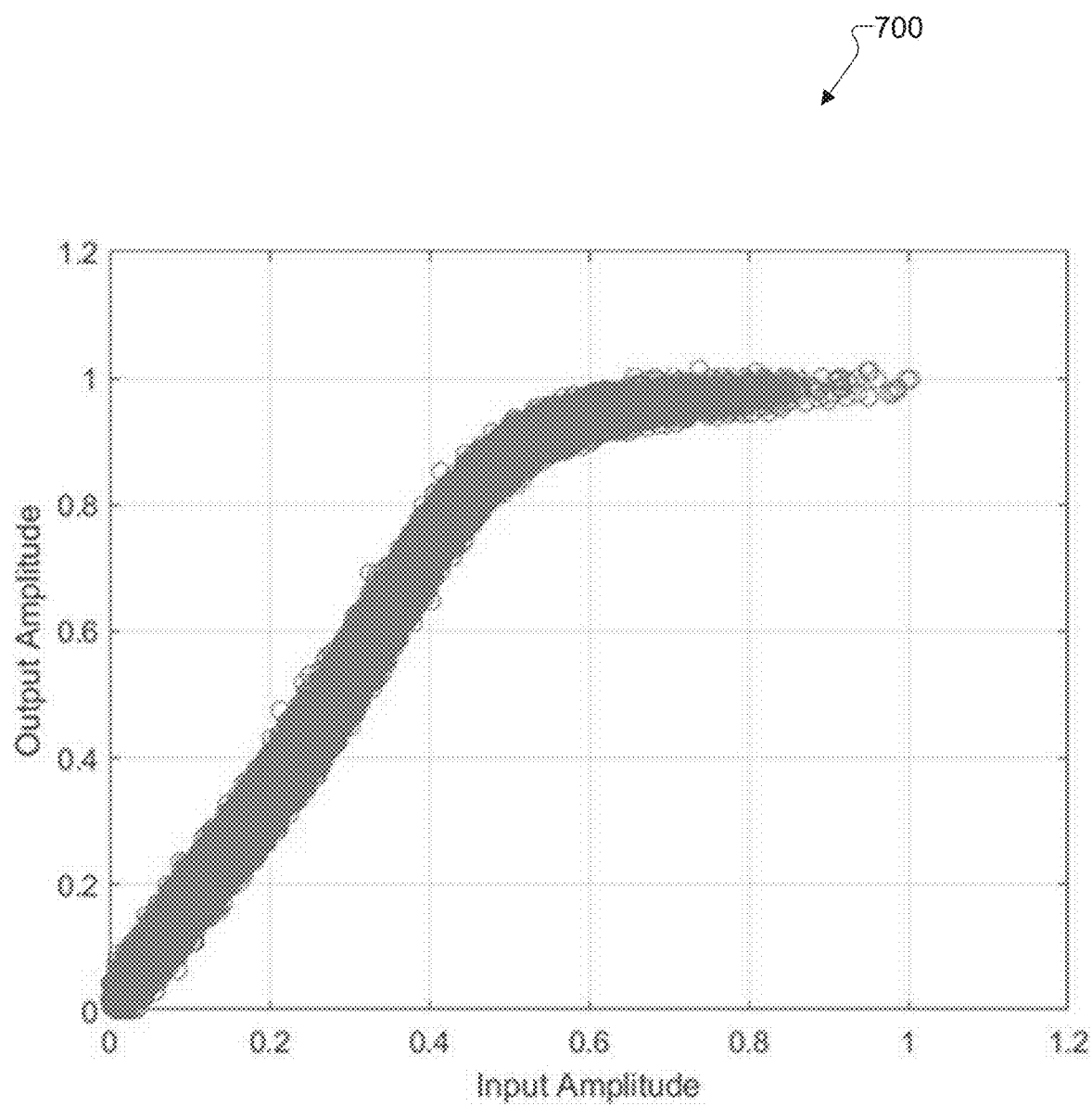
FIG. 7 illustrates an example input-output PA characteristic that obtained from measurements of an actual PA.

The example system 600 can leverage a model of a PA 608—which can inform the design of a model for a DPD 606. To that end, FIG. 7 illustrates an example input-output PA characteristic 700 that obtained from measurements of an actual PA. This PA characteristic exhibits both nonlinear distortion and memory effects (as a given input amplitude can map to multiple output amplitudes depending on the input amplitudes at previous times, e.g., due to parasitic capacitance inside the PA).

The most general model of nonlinear distortion and memory effects is the Volterra series:

$$y(n) = \sum_{k=1}^{K} y_k(n) \tag{1}$$

where:

$$y_k(n) = \sum_{m_1=0}^{M-1} \cdots \sum_{m_k=0}^{M-1} h_k(m_1, \ldots, m_k) \prod_{l=1}^{k} x(n - m_l) \tag{2}$$

Here, y(n) represents the PA output at time step n, x(n) represents the PA input at time step n, K represents the degree of nonlinearity in this model (referred to as the order of the model), and M represents the memory depth of this model. Equation (2) entails a k-dimensional convolution between the PA input x(n) and a Volterra kernel $h_k$.

The general model in equations (1) and (2) can be simplified to, e.g., facilitate estimation of its parameters. One example of a simplified model is the GMP model:

$$y_{GMP}(n) = \sum_{k=0}^{K_a-1}\sum_{l=0}^{L_a-1} a_{kl} x(n-l)|x(n-l)|^k + \sum_{k=1}^{K_b-1}\sum_{l=0}^{L_b-1}\sum_{m=1}^{M_b} b_{klm} x(n-l)|x(n-l-m)|^k + \sum_{k=1}^{K_c-1}\sum_{l=0}^{L_c-1}\sum_{m=1}^{M_c} c_{klm} x(n-l)|x(n-l-m)|^k \quad (3)$$

The GMP model in equation (3) includes several key aspects: application of a delay m between x(n) and its exponentiated envelope $|x(n)|^k$, cross-term interactions between x(n) and a lagging version of $|x(n)|^k$, i.e., $|x(n-m)|^k$, cross-term interactions between x(n) and a leading version of $|x(n)|^k$, i.e., $|x(n+m)|^k$, and coefficients $a_{kl}$, $b_{klm}$, and $c_{klm}$ that can be estimated using least-squares (LS)-based algorithms.

A GMP model can be designed for the PA 608 in FIG. 6 by, for example, an LS fit to the measurements in FIG. 7. A GMP model can also be initialized for the DPD 606 in FIG. 6. The coefficients of the GMP model for the DPD 606 can be updated to reduce (and preferably to minimize) the difference between the output of the PA 608 and an appropriately scaled version of a target constellation 610 such as a square 16-QAM constellation. Thus, modulation symbols that are close to those from a square QAM constellation can be transmitted by 1) pre-compensating for nonlinear distortion via an adjusted constellation (e.g., one of the constellations in FIG. 5) and 2) pre-compensating for memory effects via a DPD. Several LS-based methods can be utilized to this end, including a "damped" version of Newton's method:

$$w_{p+1} = w_p + \mu (Y^H Y)^{-1} Y^H e \quad (4)$$

where $w_p$ corresponds to the DPD coefficients at time step p, e corresponds to the difference between the PA output and an appropriately scaled version of a target constellation, Y corresponds to the PA output, and μ corresponds to a damping factor.

The architecture of system 600 in FIG. 6 differs from the indirect learning architecture (ILA)-DPD architecture in [6]. The ILA-DPD architecture is designed to minimize the difference between 1) pre-distorted modulation symbols from a target constellation and 2) post-distorted modulation symbols from that target constellation (i.e., the output of a DPD that is placed at the output of the PA). However, the ILA-DPD architecture cannot be directly applied in conjunction with an adjusted modulator. In particular, when an adjusted modulator is used to generate modulation symbols, minimizing the difference between the pre-distorted and post-distorted modulation symbols would not necessarily be equivalent to minimizing the difference between the output of the PA and modulation symbols from a target constellation since the constellation used by the adjusted modulator is not necessarily the target constellation. By contrast, the architecture of system 600 can achieve the goal of minimizing the difference between the output of the PA and modulation symbols from a target constellation from an adjusted modulator.

Figure 8:
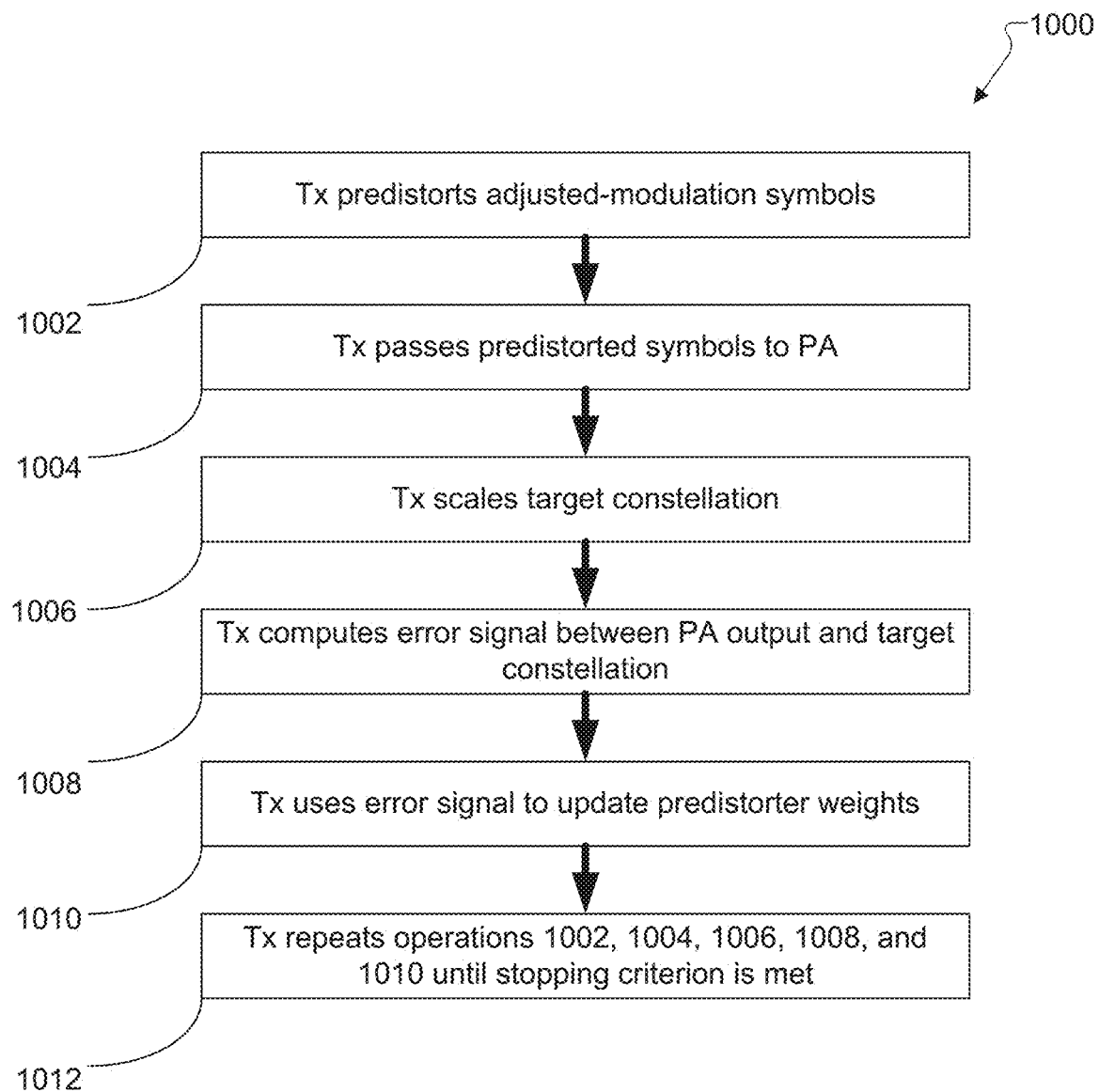
FIG. 8 illustrates an example method for operations of a transmitter (Tx) to support adjusted modulation in conjunction with data predistortion according to embodiments of the present disclosure.

FIG. 8 illustrates an example method 1000 for operations of a transmitter (Tx) to support adjusted modulation in conjunction with data predistortion according to embodiments of the present disclosure. At operation 1002, a Tx applies DPD to modulation symbols that have been generated by an adjusted modulator. At operation 1004, the Tx passes pre-distorted modulation symbols to a PA. At operation 1006, the Tx applies a scaling factor to modulation symbols that have been generated from a target constellation. In one example, after applying this scaling factor, the average energy of the scaled modulation symbols from the target constellation is equal to the average energy of the PA output. At operation 1008, the Tx computes the error between the PA output and the scaled modulation symbols from the target constellation. At operation 1010, the Tx uses this error signal to update the DPD model coefficients. One example of an update method for the DPD model coefficients is the "damped" Newton method in equation (4). At operation 1012, the Tx repeats operations 1002, 1004, 1006, 1008, and 1010 until a stopping criterion is met. One example of a stopping criterion is the norm of the error signal decreasing below a threshold. In one embodiment, operation 1006 can be performed once, and then a Tx only repeats operations 1002, 1004, 1008, and 1010 until a stopping criterion is met.

In one embodiment, before operation 1002, a Tx can perform an operation 1001 in which the Tx can use the current PA operating point to determine a modulation method. This modulation method then generates modulation symbols.

Figure 9:
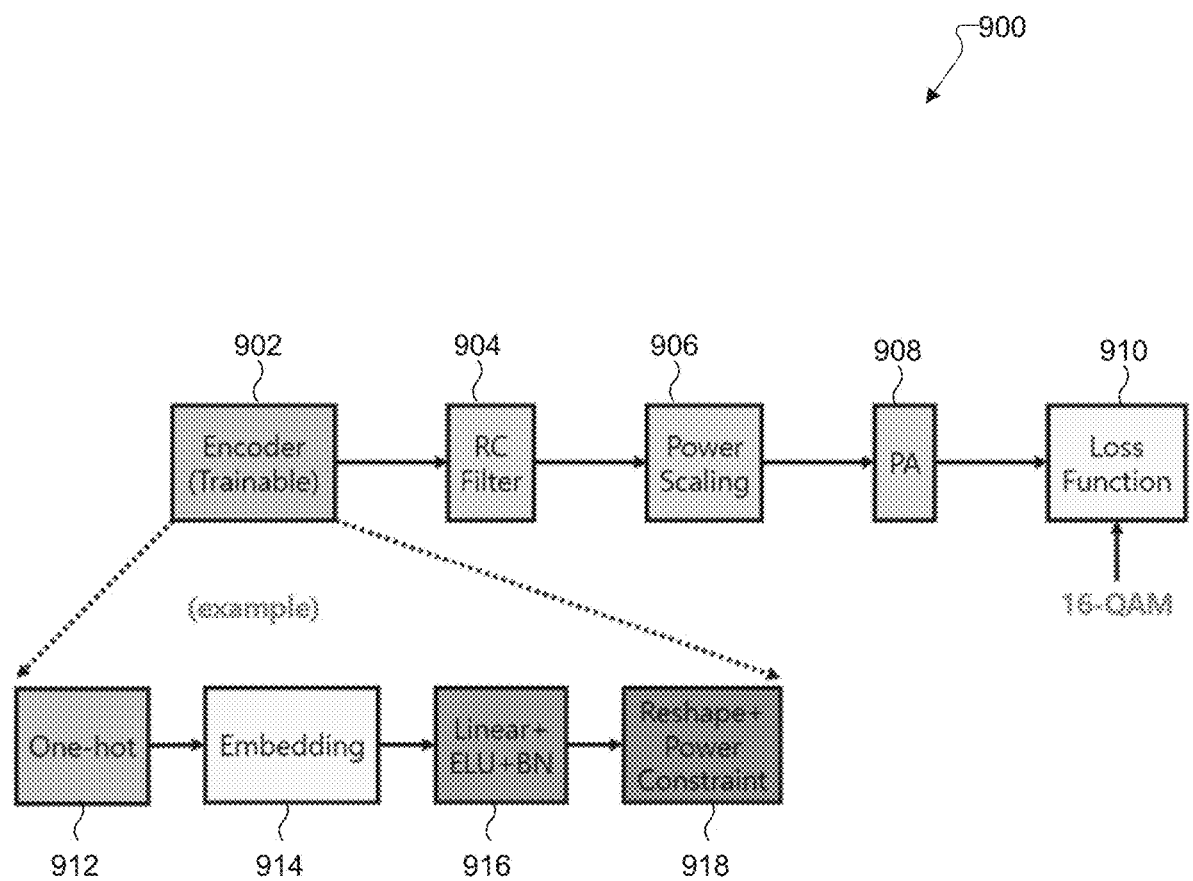
FIG. 9 illustrates an example system with a trainable modulator according to embodiments of the present disclosure.

FIG. 9 illustrates an example system 900 with a trainable modulator according to embodiments of the present disclosure. In various embodiments discussed below, the trainable modulator uses an AI-based training scheme and for ease of explanation the trainable modulator is referred to as an AI-based modulator (that implements an AI-based modulation method), but it is understood that any other suitable training scheme could be used instead. For example, a trainable encoder 902 is placed in series with other blocks, i.e., an RC filter 904, a power scaling block 906, and a PA 908. This encoder 902 can be trained to reduce (and preferably to minimize) a loss function 910 between the PA output and modulation symbols from a target constellation such as 16-QAM. Examples of loss functions include the mean squared error (MSE) loss, the binary cross entropy (BCE) loss, and the L1 loss.

There are many options for implementing the trainable encoder 902. In the example of FIG. 9, the trainable encoder 902 includes: a one-hot encoding block 912 that converts a bit string to an integer, an embedding block 914 that maps high-dimensional inputs to low-dimensional inputs, a block 916 that combines a linear layer, an exponential linear unit (ELU) activation function, and batch normalization, and a block 918 that performs reshaping and power normalization. The parameters and hyperparameters for this architecture (e.g., the input/output dimensions of the embedding block 914) can be varied during offline or online training/testing.

Figure 10:
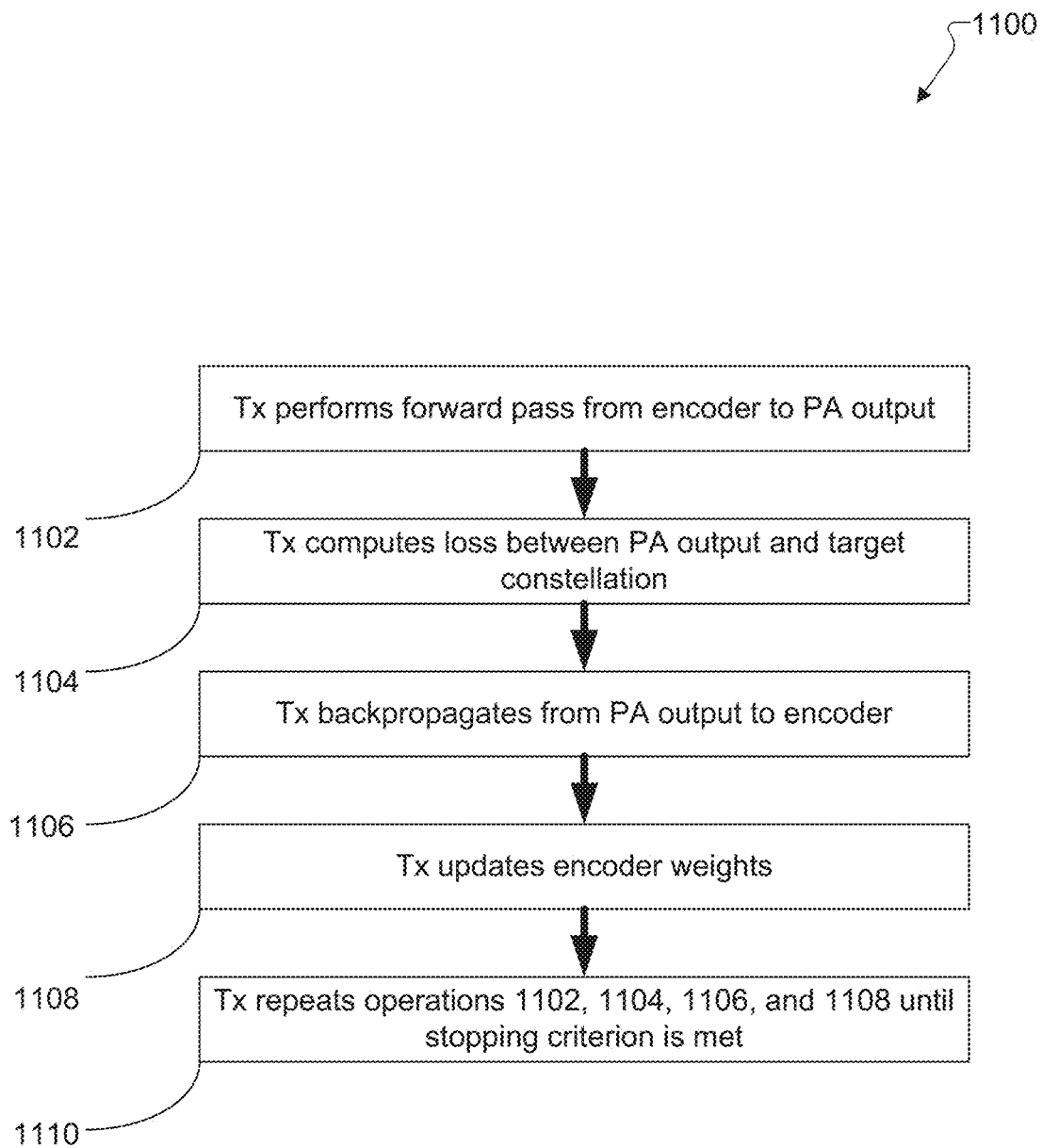
FIG. 10 illustrates an example method for operations of a transmitter to support training an AI-based modulation method according to embodiments of the present disclosure.

FIG. 10 illustrates an example method 1100 for operations of a transmitter to support training an AI-based modulation method according to embodiments of the present disclosure. At operation 1102, the Tx performs a forward pass from the input of an encoder block to the output of a PA block. At operation 1104, the Tx computes the loss between the PA output and modulation symbols from a target constellation. At operation 1106, the Tx performs a backward pass from the PA output to the encoder input. At operation 1108, the Tx uses this backward pass to update the encoder model weights. At operation 1110, the Tx repeats operations 1102, 1104, 1106, and 1108 until a stopping criterion is met. One example of a stopping criterion is the testing loss decreasing below a threshold.

Figure 11:
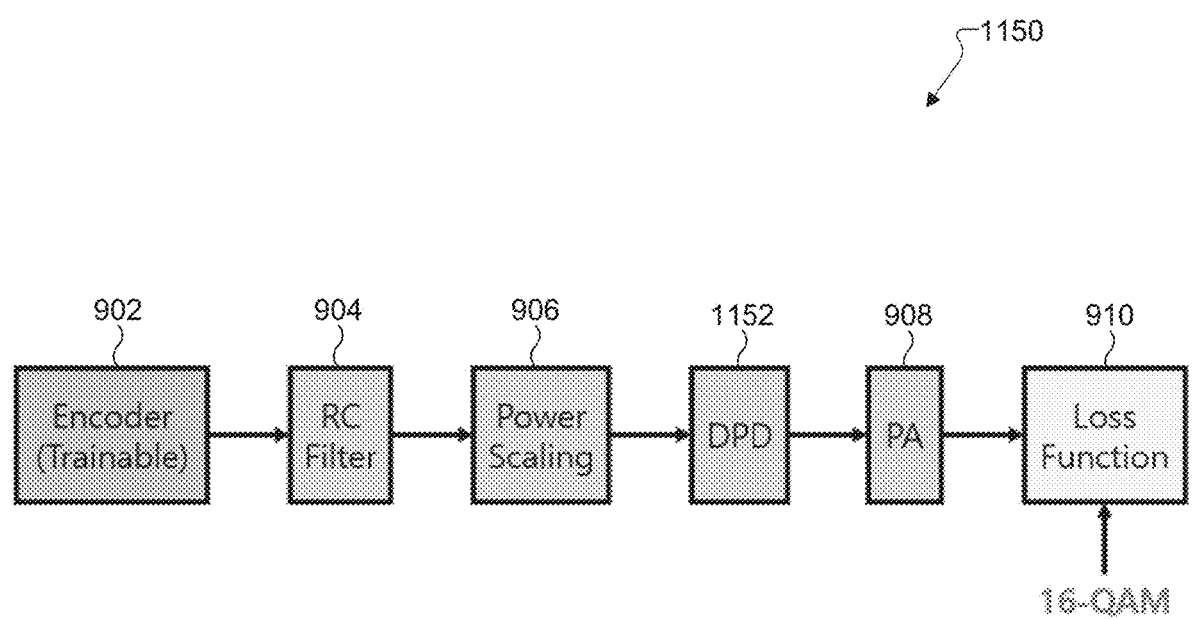
FIG. 11 illustrates an example system with a trainable modulator in conjunction with DPD according to embodiments of the present disclosure.

FIG. 11 illustrates an example system 1150 with a trainable modulator in conjunction with DPD according to embodiments of the present disclosure. The system 1150 may be a modification of the system 900 of FIG. 9. In this example, a DPD 1152 is placed between the power scaling block 906 and PA 908. This architecture supports alternating optimization of an AI-based modulation method and the DPD model coefficients.

Figure 12:
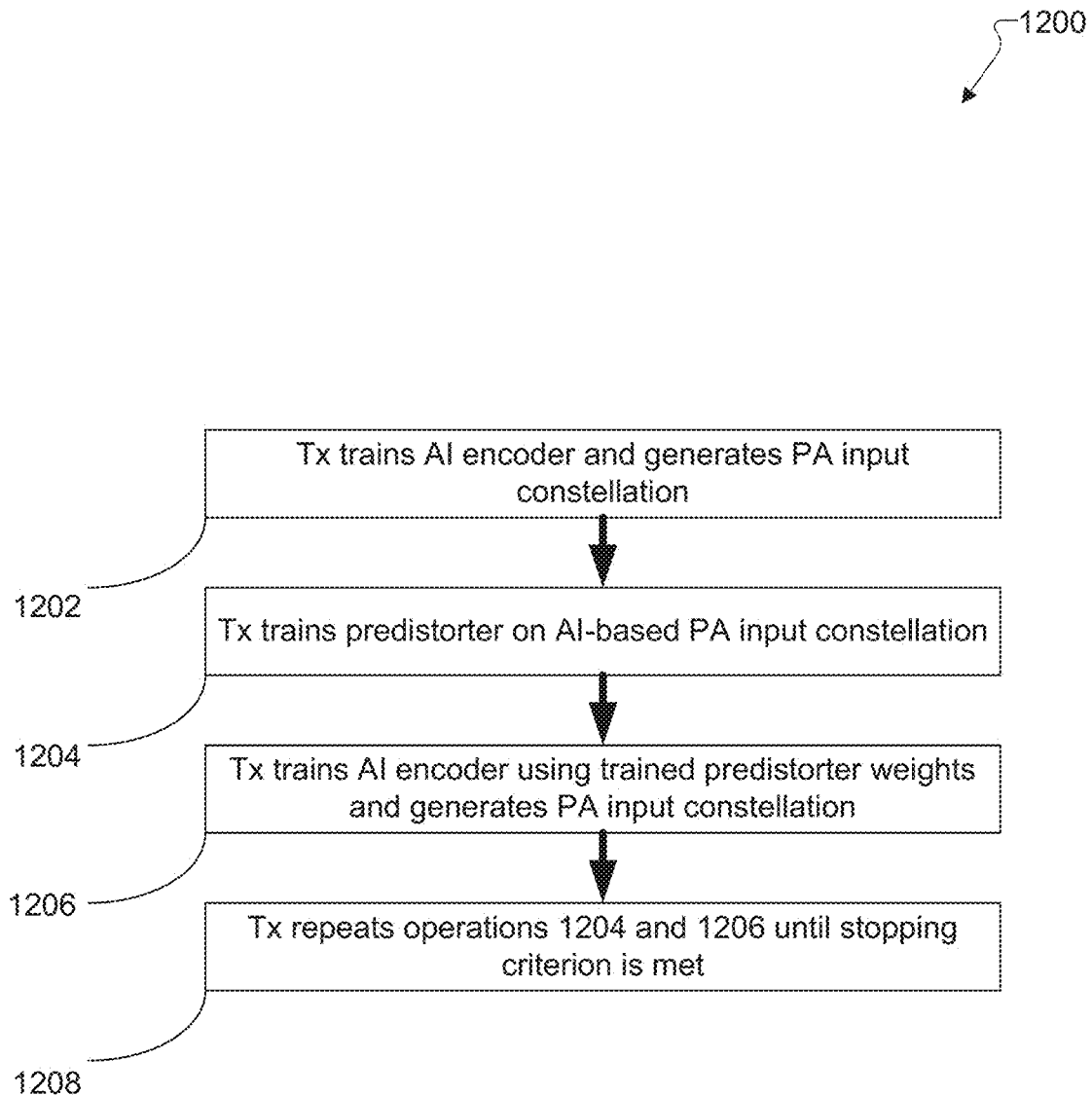
FIG. 12 illustrates an example method for operations of a transmitter to support training an AI-based modulation method in conjunction with a DPD according to embodiments of the present disclosure.

FIG. 12 illustrates an example method 1200 for operations of a transmitter to support training an AI-based modulation method in conjunction with a DPD according to embodiments of the present disclosure. At operation 1202, the Tx trains an AI-based modulation method, e.g., by applying operations 1102, 1104, 1106, 1108, and 1110 from FIG. 10. At operation 1204, the Tx uses this AI-based modulation method to train a DPD block, e.g., by applying operations 1002, 1004, 1006, 1008, 1010, and 1012 from FIG. 8. At operation 1206, the Tx uses the trained DPD block to re-train the AI-based modulation method, e.g., by applying operations 1102, 1104, 1106, 1108, and 1110 from FIG. 10 with the trained DPD block. At operation 1208, the Tx repeats operations 1204 and 1206 until a stopping criterion is met. One example of a stopping criterion is the AI-based testing loss decreasing below a threshold.

In one embodiment, the DPD 1152 in FIG. 11 can be trainable. Operation 1202 can in this case be modified to jointly train an AI-based modulation method and the DPD 1152, and operations 1204 and 1206 can be skipped.

An adjusted modulation method that accounts for the PA input-output characteristic enables flexibility in setting the PA operating point. The PA operating point is typically backed-off from its maximum value into the linear region to mitigate nonlinear distortion. Since that step decreases PA efficiency, the DC bias voltage or supply voltage is typically adapted to the operating point. Flexibility in setting the PA operating point could yield almost no power back-off or reduced power back-off (and adjustment of the DC bias voltage) when adopting non-adjusted constellations, increasing PA efficiency.

Figure 13:
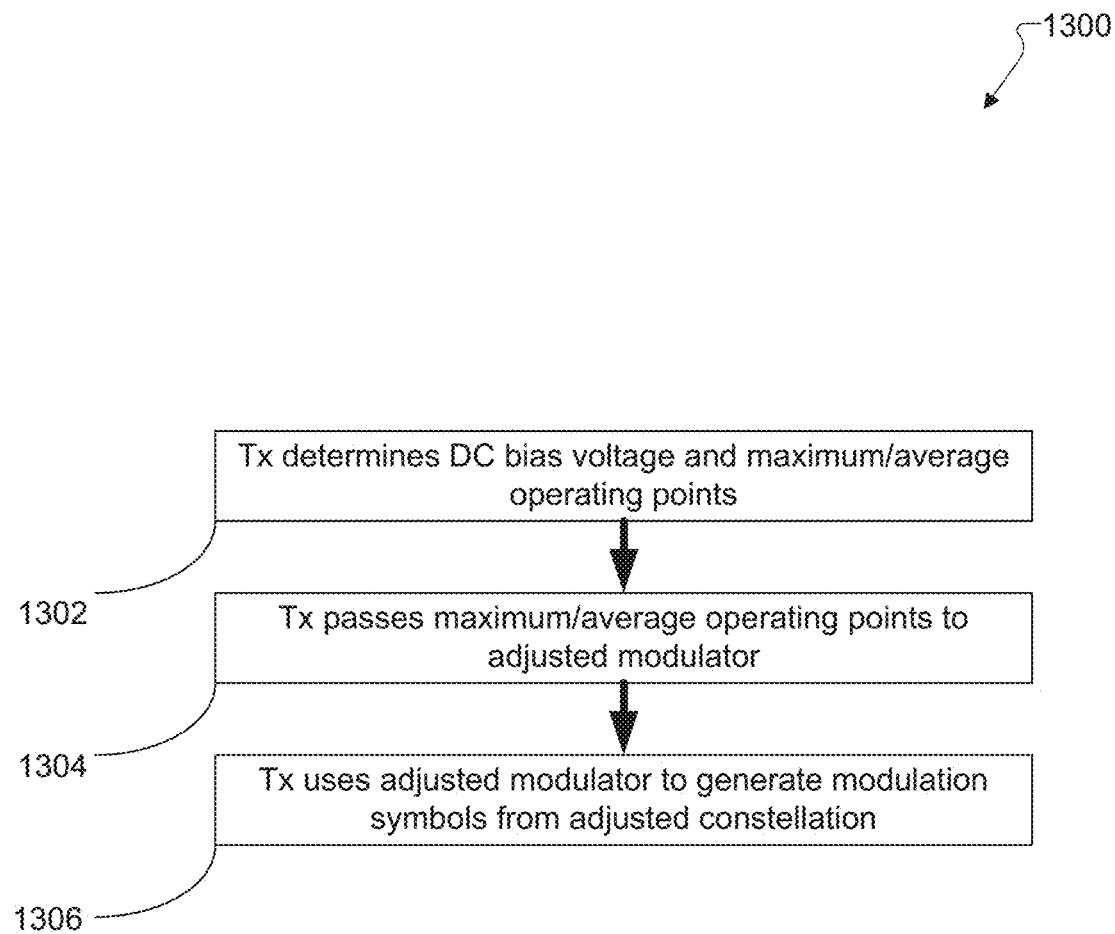
FIG. 13 illustrates an example method for operations of a transmitter to support application of an adjusted modulation method based on the PA maximum/average operating points according to embodiments of the present disclosure.

FIG. 13 illustrates an example method 1300 for operations of a transmitter to support application of an adjusted modulation method based on the PA maximum/average operating points according to embodiments of the present disclosure. At operation 1302, the Tx determines the DC bias voltage and the PA maximum/average operating points. At operation 1304, the Tx passes the PA maximum or/and average operating points to an adjusted modulation method. At operation 1306, the Tx uses this adjusted modulation method and the PA maximum/average operating points to generate modulation symbols from the corresponding constellation.

Figure 14:
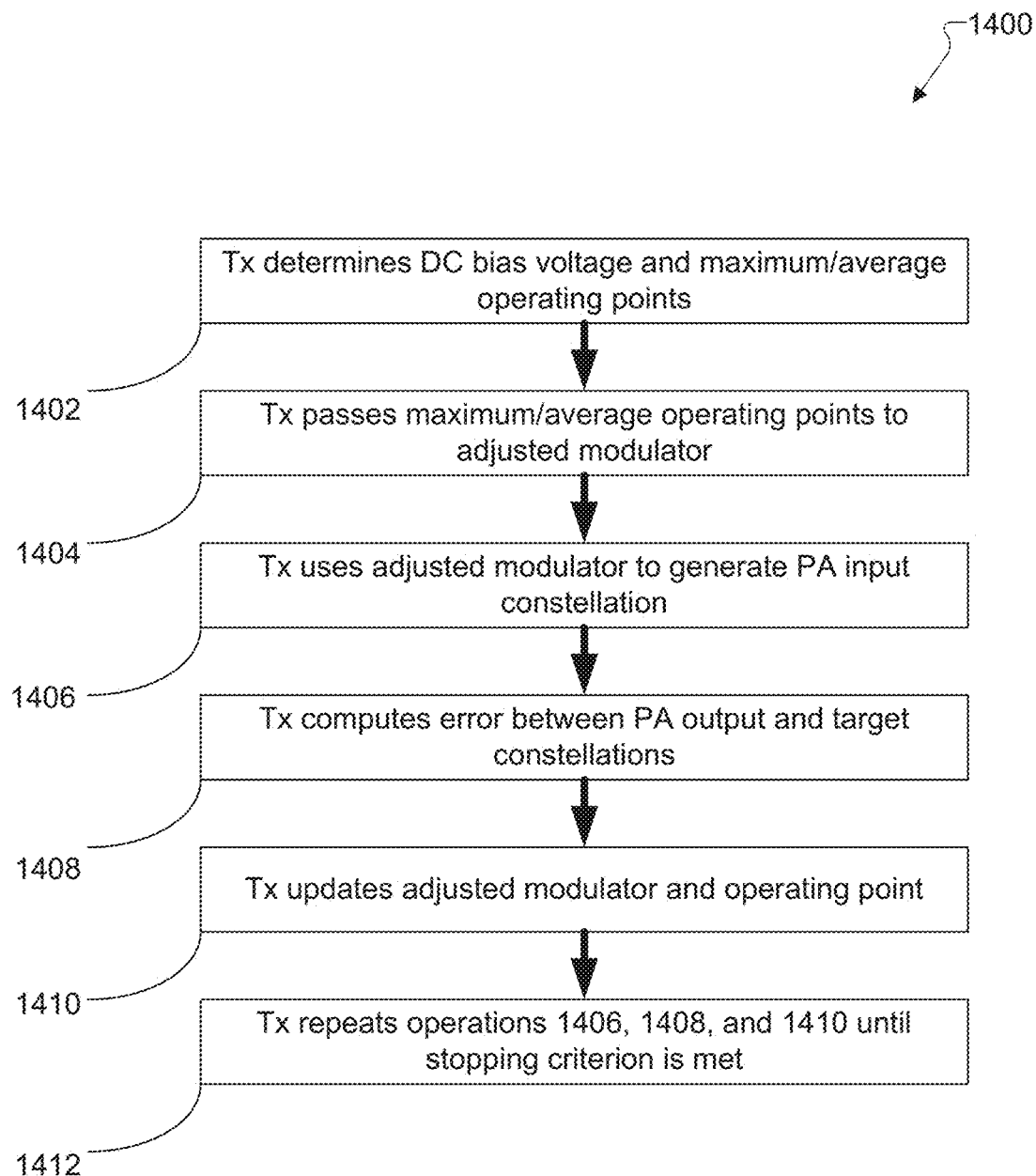
FIG. 14 illustrates an example method for operations of a transmitter to support training an adjusted modulation method based on the PA maximum or/and average operating points according to embodiments of the present disclosure.

FIG. 14 illustrates an example method 1400 for operations of a transmitter to support training an adjusted modulation method based on the PA maximum or/and average operating points according to embodiments of the present disclosure. At operation 1402, the Tx determines the DC bias voltage and the PA maximum/average operating points. At operation 1404, the Tx passes the PA maximum/average operating points to an adjusted modulator and the adjusted modulator generates modulation symbols based on the appropriate constellation for the maximum/average operating points. For example, if the maximum/average operating points are very close to the power saturation region (e.g., Region 3 (406) in FIG. 4), then a modulation constellation similar to the constellation 502 for MCS index 10 in FIG. 5 can be selected. The constellation at the output of the PA would then resemble a square QAM constellation similar to the constellation 506 for MCS index 16 in FIG. 5. At operation 1406, the Tx uses this adjusted modulation method and the PA maximum/average operating points to generate modulation symbols from the corresponding constellation. At operation 1408, the Tx computes the error between the PA output and modulation symbols from a target constellation (e.g., a standard square QAM constellation). At operation 1410, the Tx uses this error to update both the weights of the adjusted modulation method and the PA maximum/average operating points. At operation 1412, the Tx repeats operations 1406, 1408 and 1410 until a stopping criterion is met. One example of a stopping criterion is the error decreasing below a threshold.

Figure 15:
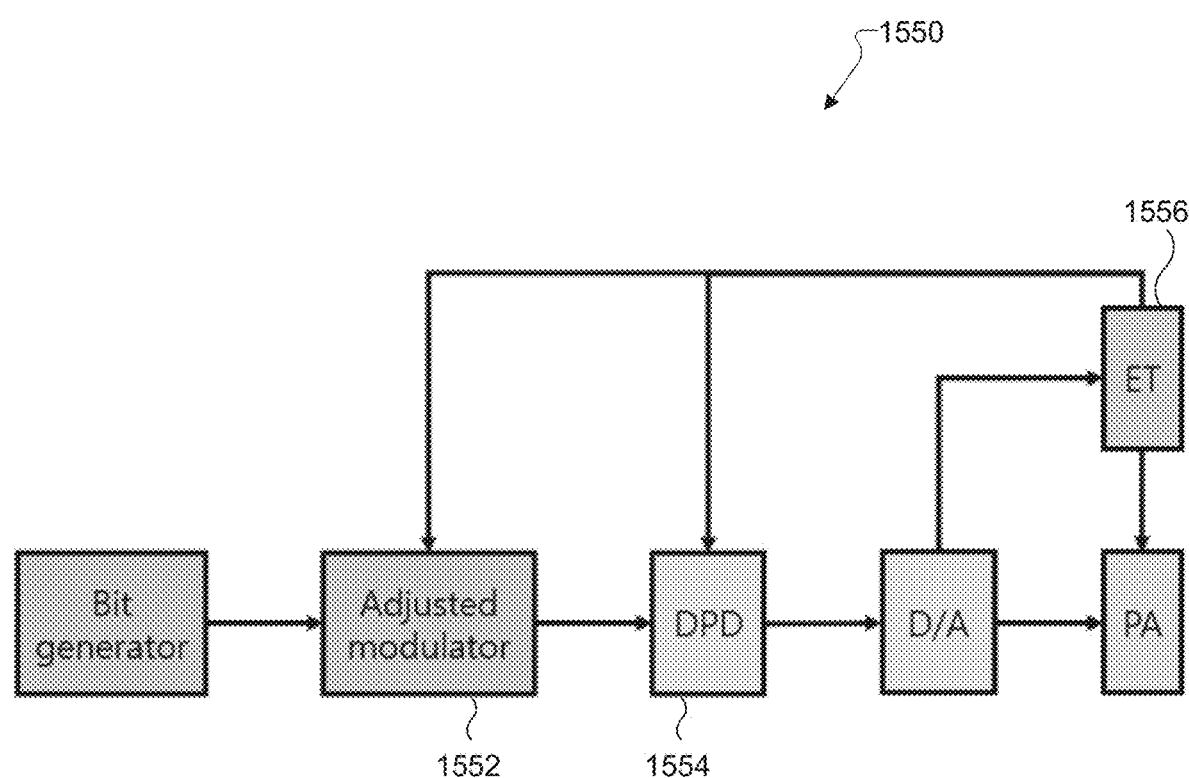
FIG. 15 illustrates an example system with a trainable adjusted modulator and DPD in conjunction with envelope tracking according to embodiments of the present disclosure.

FIG. 15 illustrates an example system 1550 with a trainable adjusted modulator and DPD in conjunction with envelope tracking according to embodiments of the present disclosure. Adjusting the DC bias voltage with the PA operating point introduces a tradeoff between complexity and PA efficiency. DC bias voltage adjustment can be facilitated by envelope tracking with an envelope tracker (ET), motivating the joint optimization framework that is illustrated in FIG. 15. An adjusted modulator 1552 (that implements an adjusted modulation method) and a DPD 1554 can be jointly updated in conjunction with an ET 1556.

Figure 16:
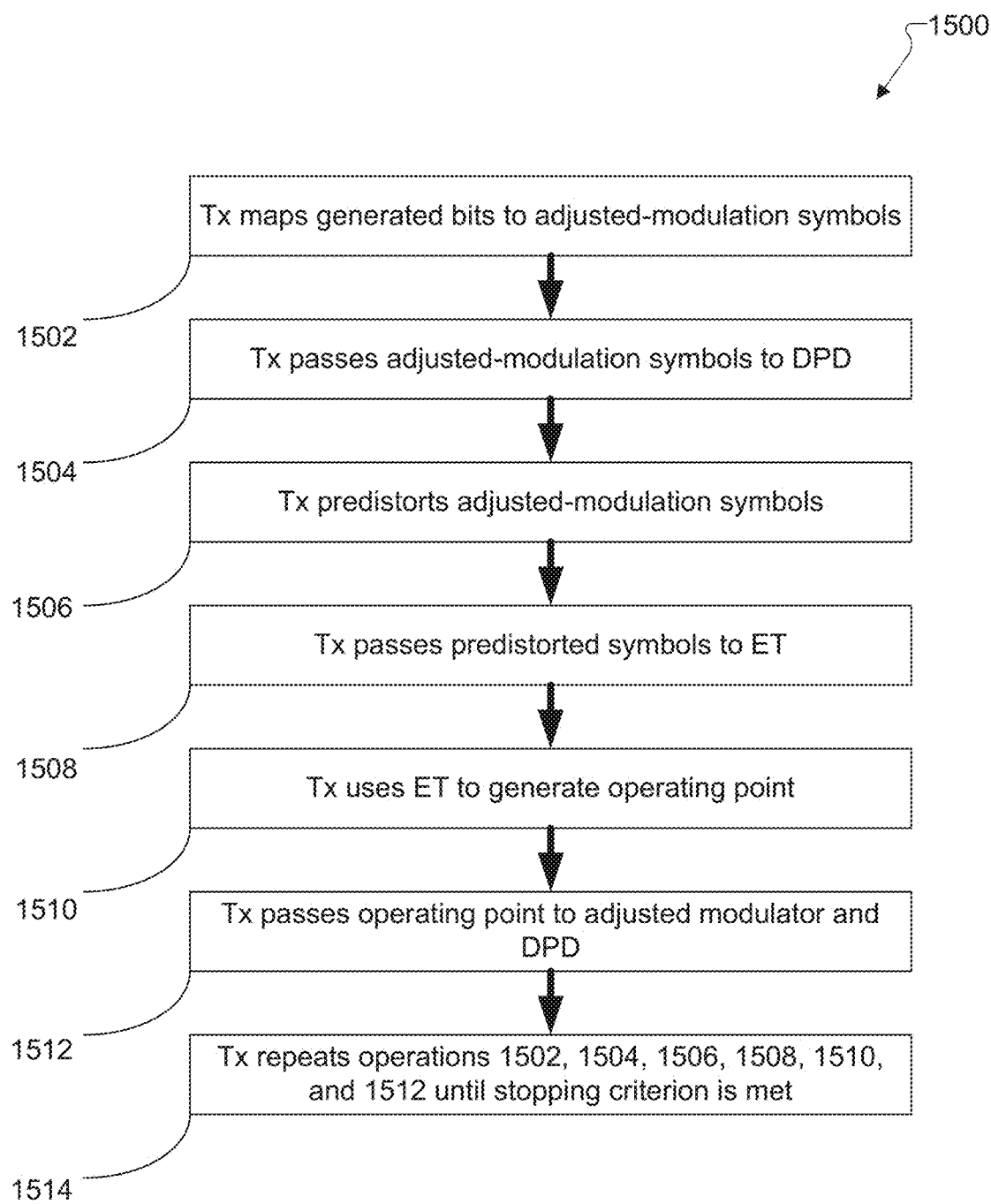
FIG. 16 illustrates an example method for operations of a transmitter to support training an adjusted modulation method in conjunction with DPD and ET according to embodiments of the present disclosure.

FIG. 16 illustrates an example method 1500 for operations of a transmitter to support training an adjusted modulation method in conjunction with DPD and ET according to embodiments of the present disclosure. At operation 1502, the Tx uses an adjusted modulator to generate modulation symbols based on the appropriate constellation for the current PA maximum/average operating points. For example, if the maximum/average operating points are very close to the power saturation region (e.g., Region 3 (406) in FIG. 4), then a modulation constellation similar to the constellation 502 for MCS index 10 in FIG. 5 can be selected. The constellation at the output of the PA would then resemble a square QAM constellation similar to the constellation 506 for MCS index 16 in FIG. 5. At operation 1504, the Tx passes these modulation symbols to a DPD block. At operation 1506, the Tx uses this DPD block to pre-distort these modulation symbols. At operation 1508, the Tx passes these pre-distorted symbols to a D/A converter, and the D/A converter then passes its output to an ET block. In certain implementations, the Tx can directly pass these pre-distorted symbols to the ET block (without D/A conversion). At operation 1510, the Tx uses this ET block to determine a PA operating point. At operation 1512, the Tx passes this PA operating point to both the adjusted modulation method and the DPD block, which use this PA operating point to update their corresponding model coefficients. At operation 1514, the Tx repeats operations 1502, 1504, 1506, 1508, 1510 and 1512 until a stopping criterion is met. One example of a stopping criterion is the DPD error decreasing below a threshold.

Figure 17:
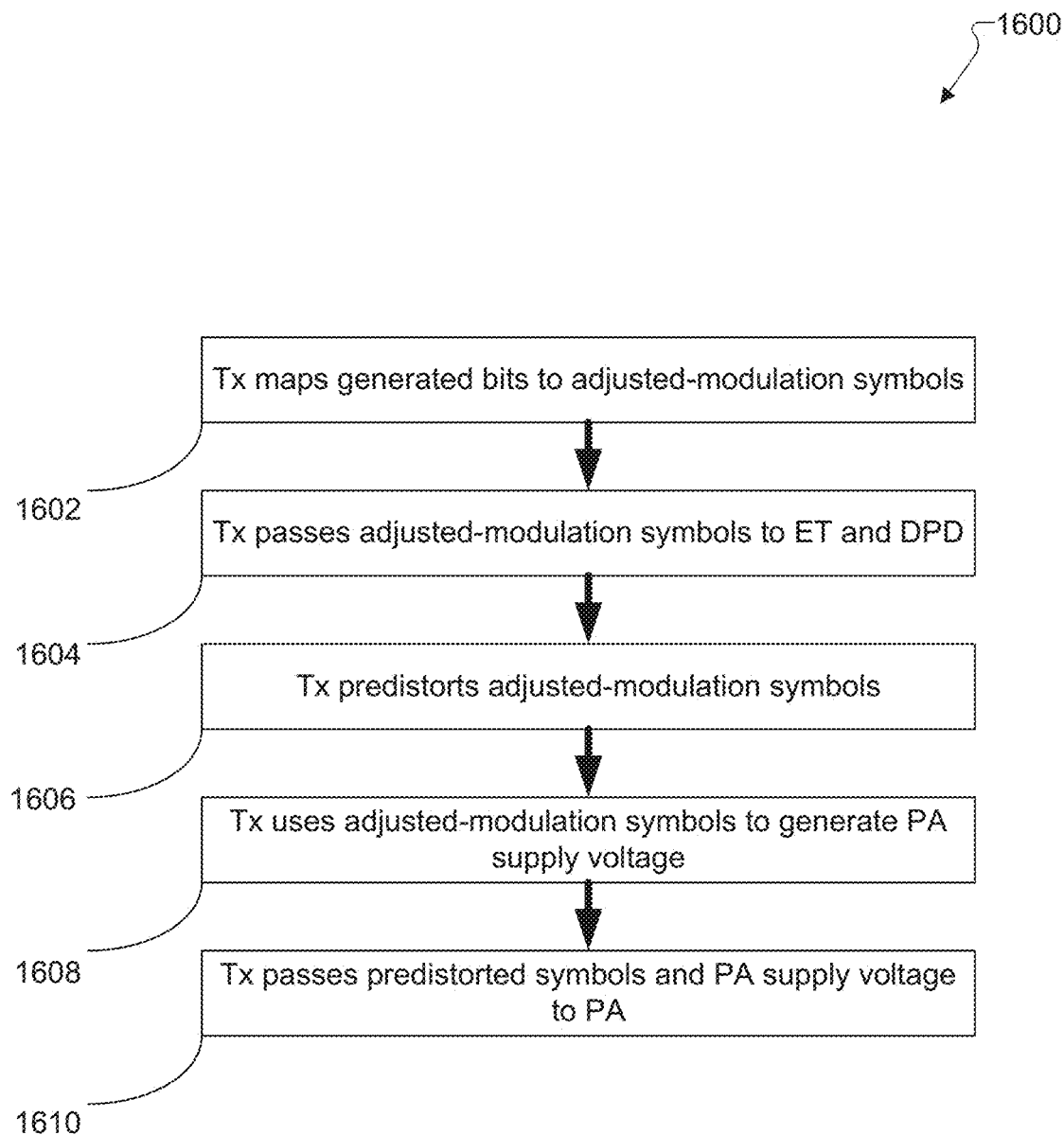
FIG. 17 illustrates an example method for operations of a transmitter to support a trained adjusted modulation method in conjunction with a trained DPD module and ET according to embodiments of the present disclosure.

FIG. 17 illustrates an example method 1600 for operations of a transmitter to support a trained adjusted modulation method in conjunction with a trained DPD module and ET according to embodiments of the present disclosure. At operation 1602, the Tx uses a trained adjusted modulator to generate modulation symbols based on the appropriate constellation for the current PA maximum/average operating points—where a "trained" adjusted modulator is one that selects the appropriate constellation based on a finalized PA operating point (e.g., a PA operating point that is determined at operation 1514 of FIG. 16). For example, if the maximum/average operating points are very close to the power saturation region (e.g., Region 3 (406) in FIG. 4), then a modulation constellation similar to the constellation 502 for MCS index 10 in FIG. 5 can be selected. The constellation at the output of the PA would then resemble a square QAM constellation similar to the constellation 506 for MCS index 16 in FIG. 5. At operation 1604, the Tx passes these modulation symbols to a trained DPD block—where a "trained" DPD uses model coefficients that are set based on the finalized PA operating point (e.g., the PA operating point that is determined at operation 1514 of FIG. 16). At operation 1606, the Tx uses this trained DPD block to pre-distort these modulation symbols. At operation 1608, the Tx passes these pre-distorted symbols to a D/A converter. The D/A converter then passes its output to an ET block, which determines a DC bias voltage. In certain implementations, the Tx can directly pass these pre-distorted symbols to the ET block without D/A conversion. At operation 1610, the Tx passes these pre-distorted symbols and a DC bias voltage to the PA.

Figure 18:
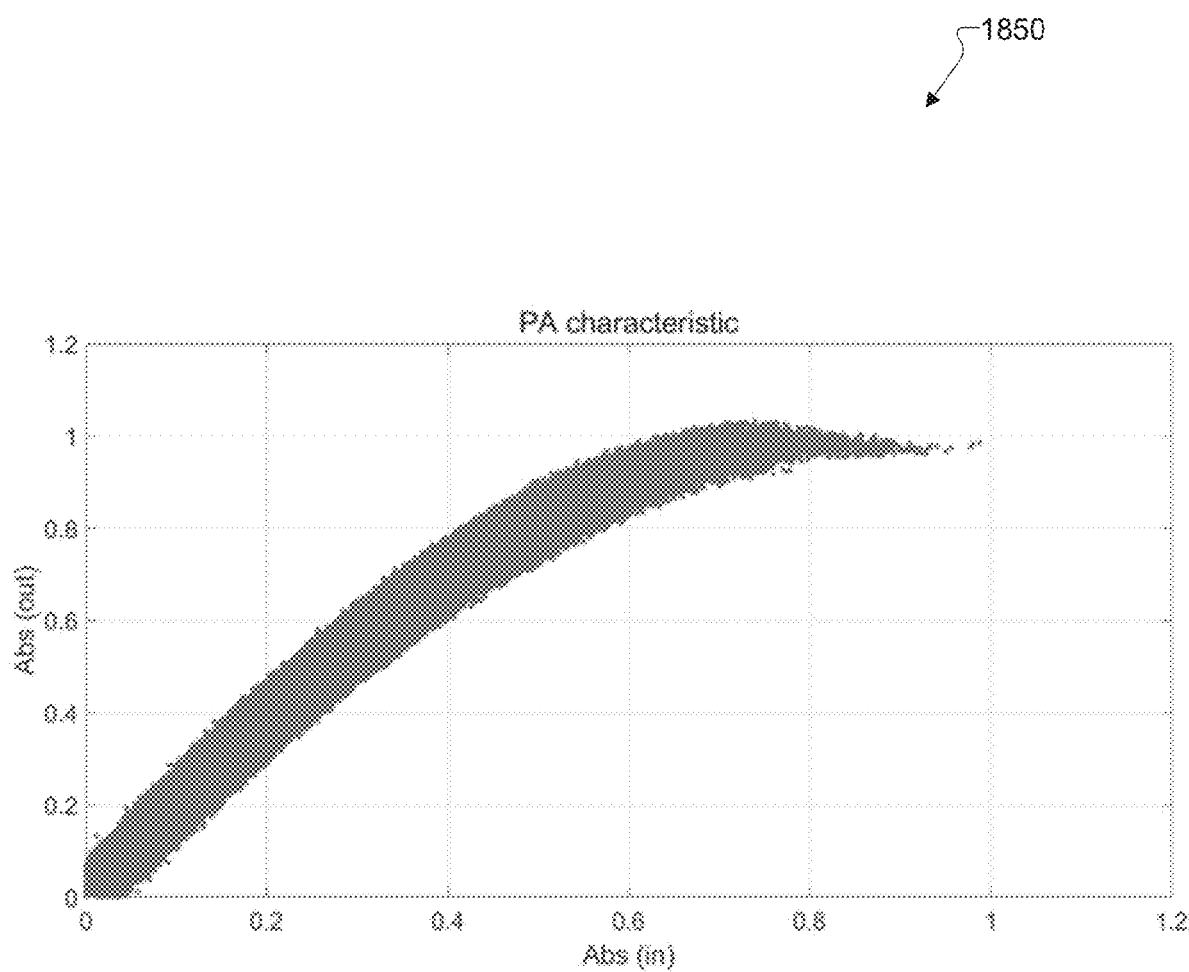
FIG. 18 illustrates an example input-output PA characteristic used for performance evaluations according to embodiments of the present disclosure.

FIG. 18 illustrates an example input-output PA characteristic 1850 used for performance evaluations according to embodiments of the present disclosure. The input-output PA characteristic 1850 exhibits the saturation in the nonlinear region that can be observed in FIG. 4. The input-output characteristic 1850 also exhibits memory effects, as a given input level can map to multiple output levels, depending on the input levels of modulation symbols at previous time instants. A GMP model of order K=9 and memory depth M=25 (along with an oversampling factor of 16) was used to generate the input-output characteristic 1850.

Figure 19:
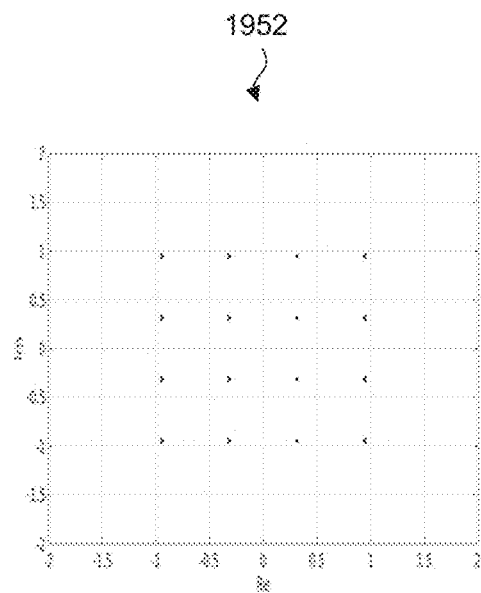
FIG. 19 illustrates a graph of an example of the impact of PA saturation and memory effects on a conventional modulation method according to embodiments of the present disclosure.
Figure 19:
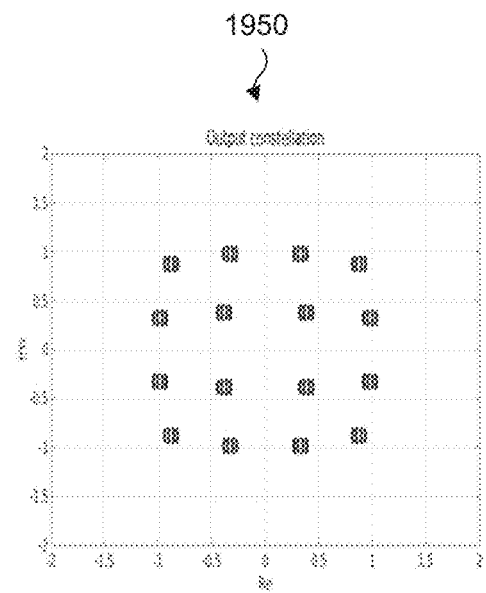

FIG. 19 illustrates a graph of an example of the impact of PA saturation and memory effects on a conventional modulation method according to embodiments of the present disclosure. In the example of FIG. 19, the conventional modulation method is 16-QAM. The constellation 1952 on the left is the conventional 16-QAM constellation. The constellation 1950 on the right corresponds to the PA output when the constellation 1952 is input to the PA. The impact of PA saturation can be seen in the inward shift of the four outermost constellation points (especially compared to their eight nearest neighbors). The impact of memory effects can be seen in the small "clumps" of points—if each input level only mapped to a single output level, then each of these small "clumps" would collapse to a single point.

Figure 20:
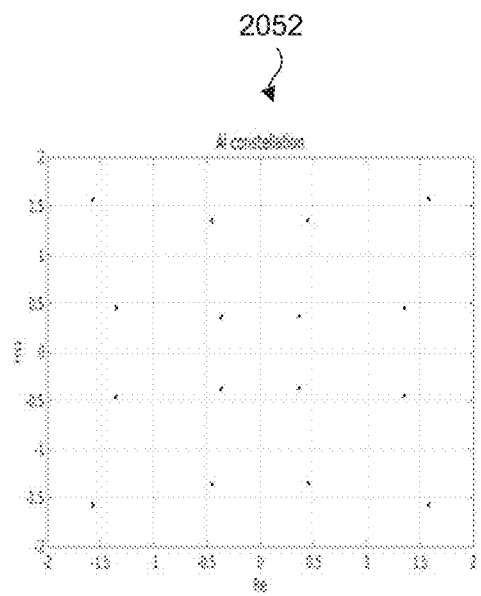
FIG. 20 illustrates a graph of an example of the impact of PA saturation and memory effects on an adjusted modulation method according to embodiments of the present disclosure.
Figure 20:
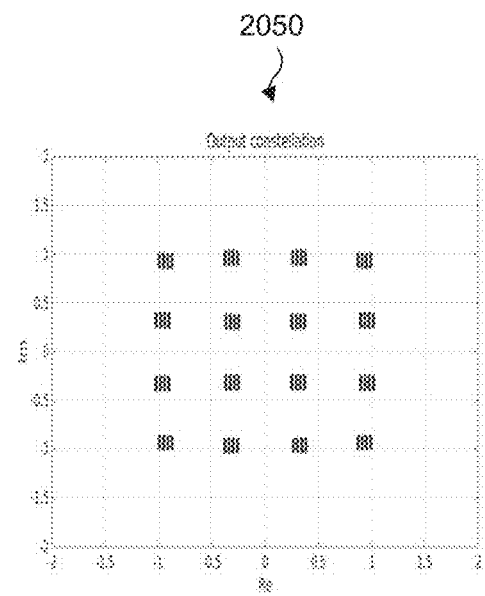

FIG. 20 illustrates a graph of an example of the impact of PA saturation and memory effects on an adjusted modulation method according to embodiments of the present disclosure. In the example of FIG. 20, the adjusted modulation method has been designed using an AI architecture. The constellation 2052 on the left is the AI-designed constellation, which is based on the conventional 16-QAM constellation (e.g., constellation 1952 of FIG. 19). The constellation 2050 on the right corresponds to the PA output when the constellation 2052 is input to the PA. As compared to the constellation 1950 of FIG. 19, the reduction of the impact of PA saturation can be seen in the four outermost constellation points, which are now roughly on the same level as their eight nearest neighbors. The impact of memory effects, however, can still be observed in the small "clumps" of points.

Table 1 is an example architecture for an AI-based encoder (e.g., the AI-based encoder used to train the adjusted modulation method applied in FIG. 20). The number of Linear+ELU+BN blocks was set to 3, and a Linear layer was placed between the third Linear+ELU+BN block and the reshape step.

TABLE 1

| Layers | Output Dimensions |
| --- | --- |
| Input | 4 × 1 |
| One-hot encoding | 1 × 1 |
| Embedding | 64 × 1 |
| Linear + ELU + BN | 64 × 1 |
| Linear + ELU + BN | 32 × 1 |
| Linear + ELU + BN | 16 × 1 |
| Linear | 2 × 1 |
| Reshape | 2 × 1 |
| Power Constraint | 2 × 1 |

Figure 21:
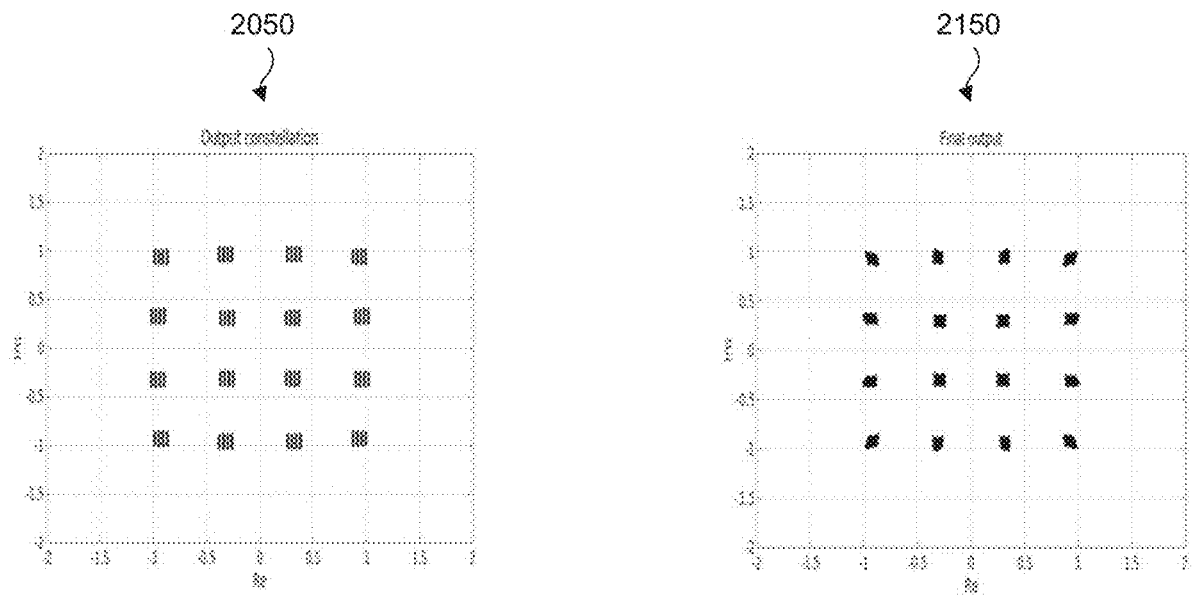
FIG. 21 illustrates a graph of an example of the impact of DPD on the residual memory effects for an adjusted modulation method according to embodiments of the present disclosure.

FIG. 21 illustrates a graph of an example of the impact of DPD on the residual memory effects for an adjusted modulation method according to embodiments of the present disclosure. In the example of FIG. 21, the adjusted modulation method is a modulation method that has been designed using an AI architecture—specifically, the adjusted modulation method used in FIG. 20. The constellation 2050 on the left is the PA output for the AI-designed constellation 2052, where DPD was not applied before input to the PA. The constellation 2150 on the right corresponds to the PA output for the AI-designed constellation 2052 with DPD applied before input to the PA. The reduction of the residual memory effects resulting from DPD can be seen in that each "clump" of points is smaller (or more tightly grouped) in the constellation 2150 on the right as compared to the analogous "clump" in the constellation 2050 on the left.

The DPD parameters that were used to generate the results in FIG. 21 were: order=3, memory depth=11, lag depth=13, number of iterations=150, coefficient update method=exponential moving average, and learning rate=0.01.

Figure 22:
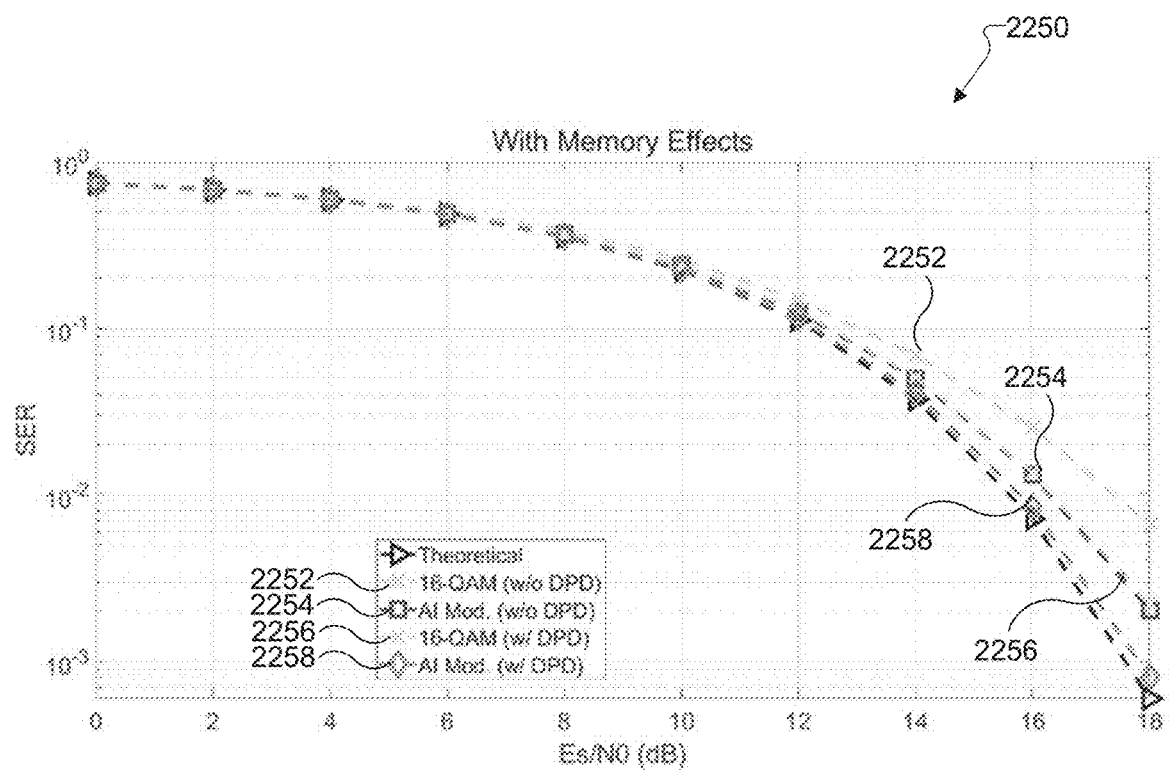
FIG. 22 is an example SER graph illustrating the impact of PA saturation and memory effects on different modulation methods according to embodiments of the present disclosure.

FIG. 22 is an example SER graph 2250 illustrating the impact of PA saturation and memory effects on different modulation methods according to embodiments of the present disclosure. Trace 2252 corresponds to a modulation method using the conventional 16-QAM constellation (without applying DPD). This modulation method is outperformed by an adjusted modulation method using an AI-designed constellation (without applying DPD), as seen in trace 2254, illustrating that this AI-designed constellation has reduced the impact of PA saturation. Applying DPD in conjunction with both of these modulation methods reduces the impact of residual memory effects, as seen in trace 2256 (for the conventional 16-QAM constellation) and trace 2258 (for the AI-designed constellation).

Figure 23:
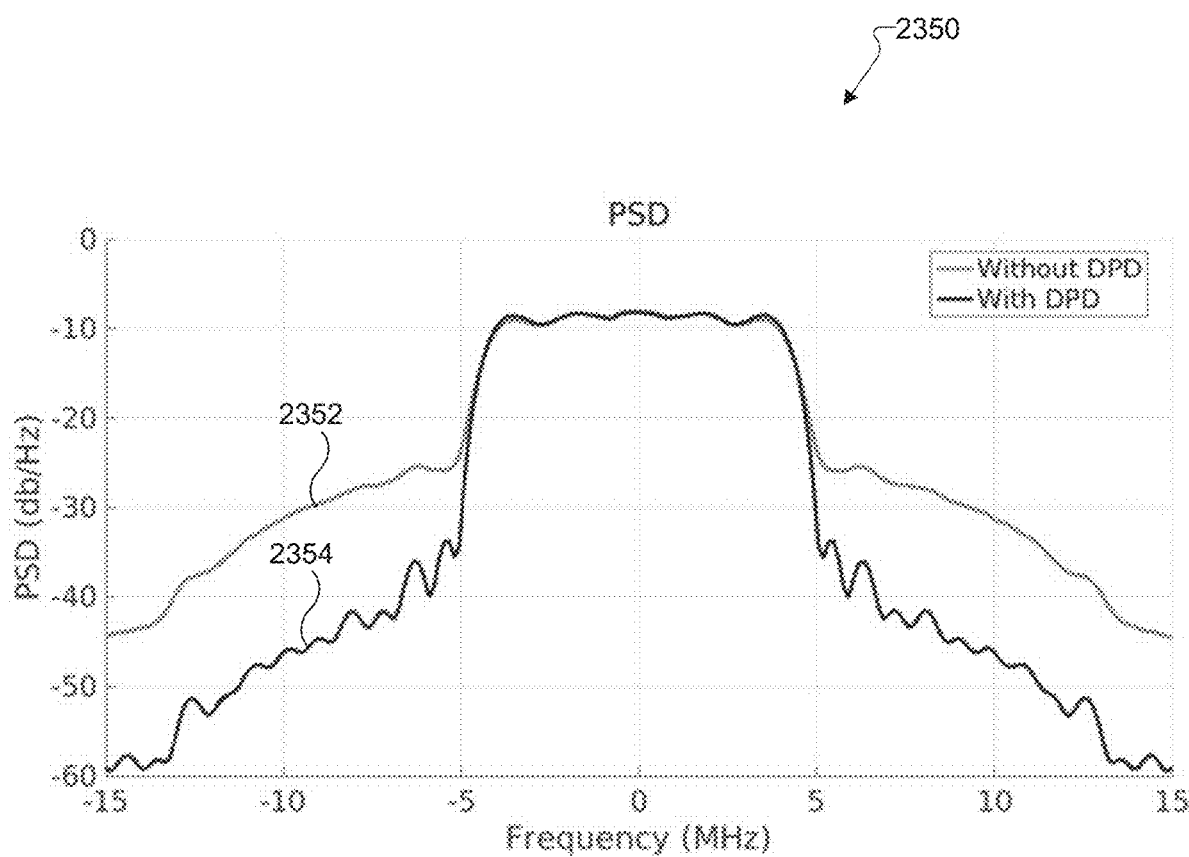
FIG. 23 is an example PSD graph illustrating ACLR for a conventional 16-QAM constellation with and without applying DPD according to embodiments of the present disclosure.

FIG. 23 is an example PSD graph 2350 illustrating ACLR for a conventional 16-QAM constellation with and without applying DPD according to embodiments of the present disclosure. The PSD graph 2350 may be used to evaluate the impact of memory effects on modulation methods with and without applying DPD. Trace 2352 corresponds to the PSD for the conventional 16-QAM constellation without applying DPD. Trace 2354 corresponds to the PSD for the conventional 16-QAM constellation with DPD applied, illustrating that DPD has reduced the impact of memory effects. Specifically, the ACLR without DPD is 21 dB, while the ACLR with DPD is 34 dB.

Figure 24:
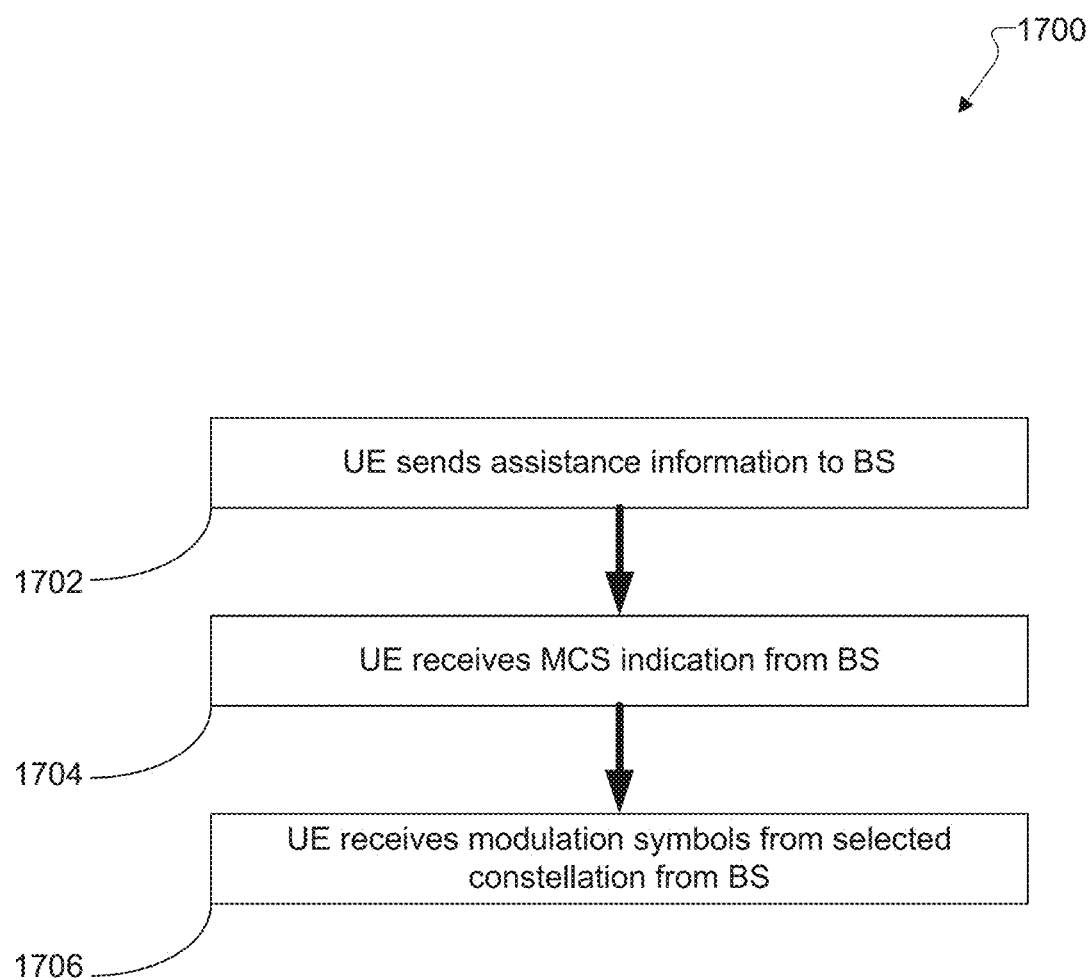
FIG. 24 illustrates an example method for operations of a UE to support UE assistance for different constellations depending on MCS index for a given modulation order according to embodiments of the present disclosure.

FIG. 24 illustrates an example method 1700 for operations of a UE to support UE assistance for different constellations depending on MCS index for a given modulation order according to embodiments of the present disclosure.

At operation 1702, a UE sends assistance information to a BS. The assistance information can include a recommendation for an MCS index, which is described further below. At operation 1704, the UE receives an MCS indication message from the BS. The BS can use an existing DCI format for this MCS indication message. It can also define a new DCI format for this MCS indication message. In one example, the UE uses this MCS indication message to determine an MCS index. In another example, the UE autonomously determines an MCS index. At operation 1706, the UE receives modulation symbols from the BS, which may have been selected from the constellation corresponding to the MCS index.

Figure 25:
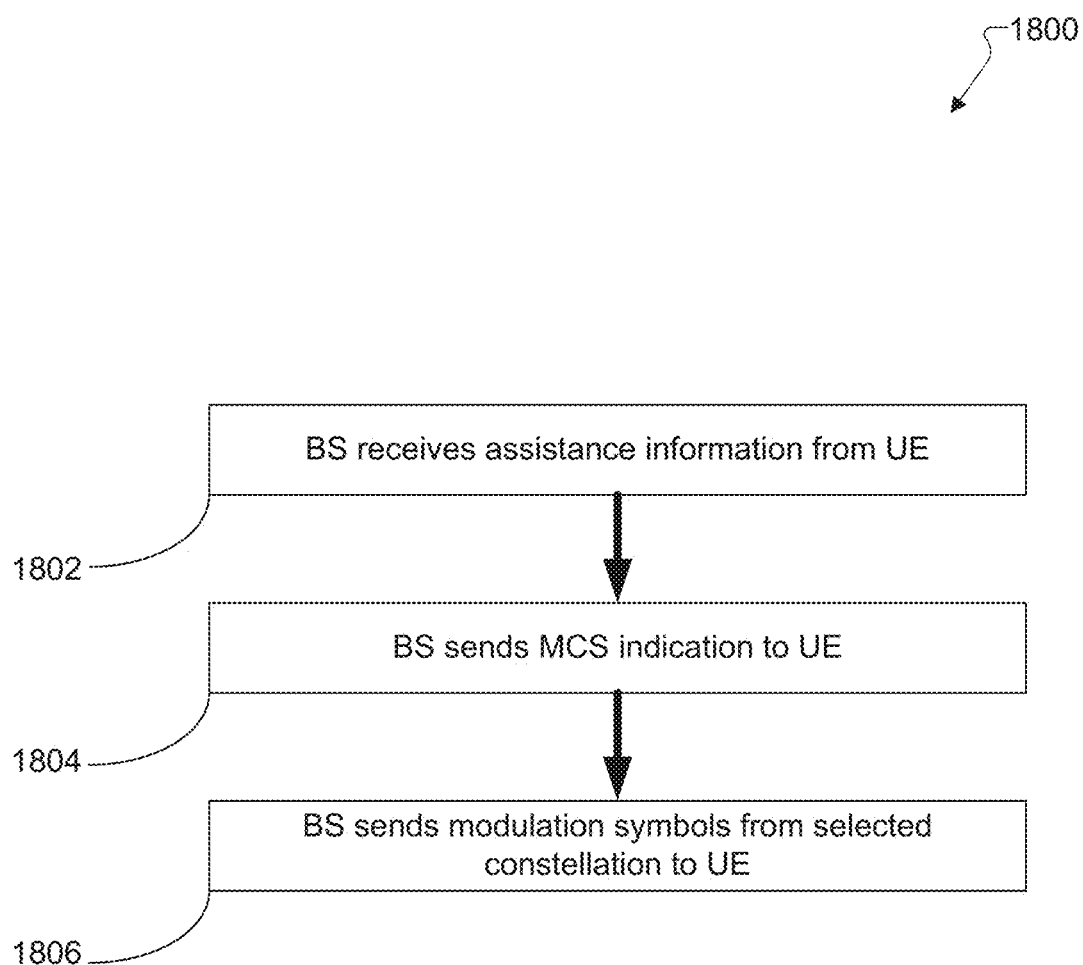
FIG. 25 illustrates an example method for operations of a BS to support UE assistance for different constellations depending on MCS index for a given modulation order according to embodiments of the present disclosure.

FIG. 25 illustrates an example method 1800 for operations of a BS to support UE assistance for different constellations depending on MCS index for a given modulation order according to embodiments of the present disclosure. At operation 1802, a BS receives assistance information from a UE. The assistance information can include a recommendation for an MCS index, which is described further below. At operation 1804, the BS sends an MCS indication message to a UE. The BS can use an existing DCI format for this MCS indication message. It can also define a new DCI format for this MCS indication message. In one example, the UE uses this MCS indication message to determine an MCS index. In another example, the UE autonomously determines an MCS index. At operation 1806, the BS sends modulation symbols to the UE, which may have been selected from the constellation corresponding to the MCS index.

Figure 26:
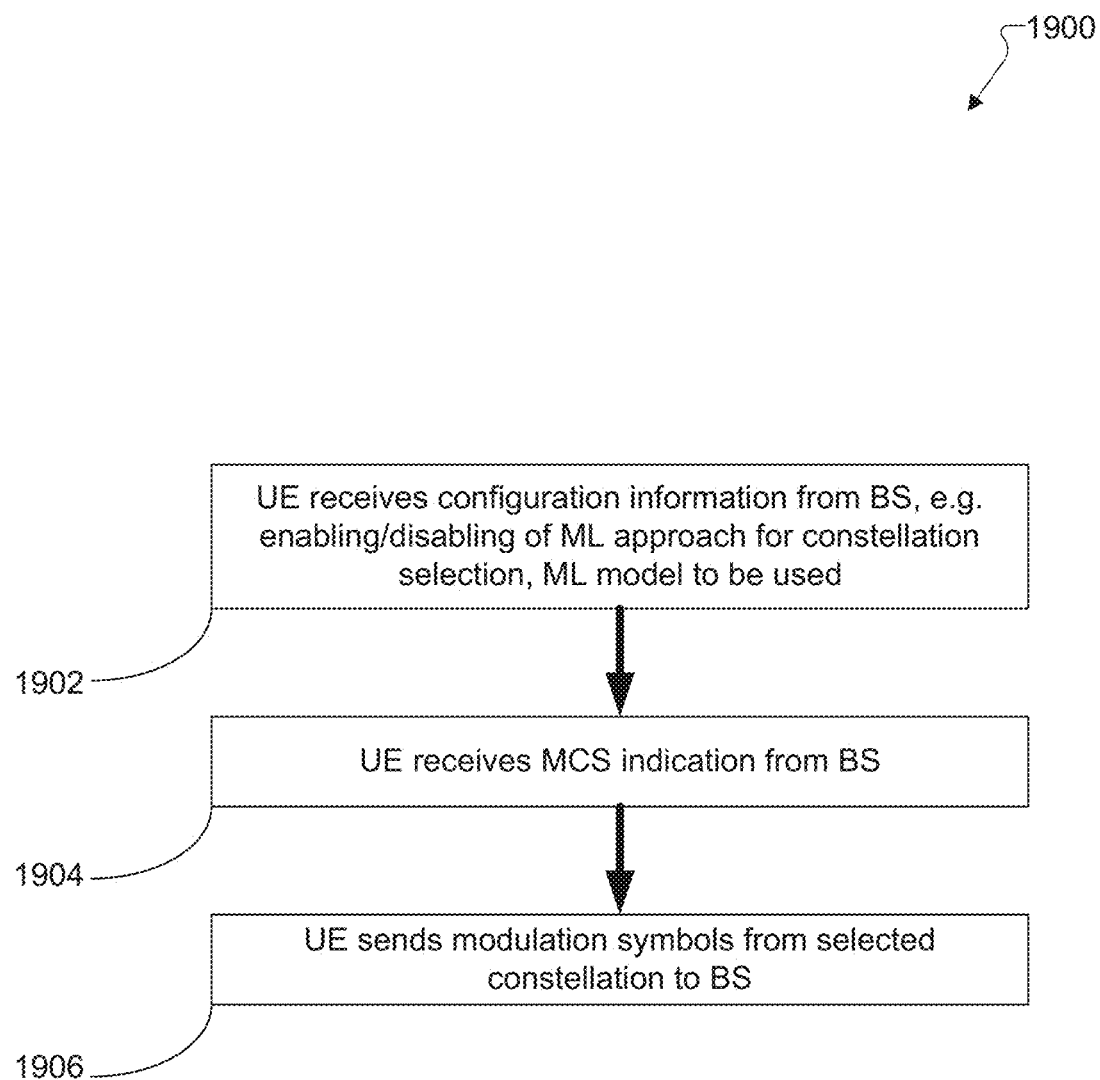
FIG. 26 illustrates an example method for operations of a UE to support UE-side ML-based MCS index-dependent constellations for a given modulation order according to embodiments of the present disclosure.

FIG. 26 illustrates an example method 1900 for operations of a UE to support UE-side ML-based MCS index-dependent constellations for a given modulation order according to embodiments of the present disclosure. At operation 1902, a UE receives configuration information from a BS, which can include ML-related (or AI-related) configuration information such as enabling/disabling of an ML approach for different constellations depending on MCS index for a given modulation order, an ML model to be used, trained model parameters, and whether model parameter updates reported by the UE will be used or not. At operation 1904, the UE receives an MCS indication message from the BS. The BS can use an existing DCI format for this MCS indication message. It can also define a new DCI format for this MCS indication message. In one example, the UE uses this MCS indication message to determine an MCS index. In another example, the UE autonomously determines an MCS index. At operation 1906, the UE sends modulation symbols to the BS, which may have been selected from an ML-determined constellation corresponding to the MCS index.

Figure 27:
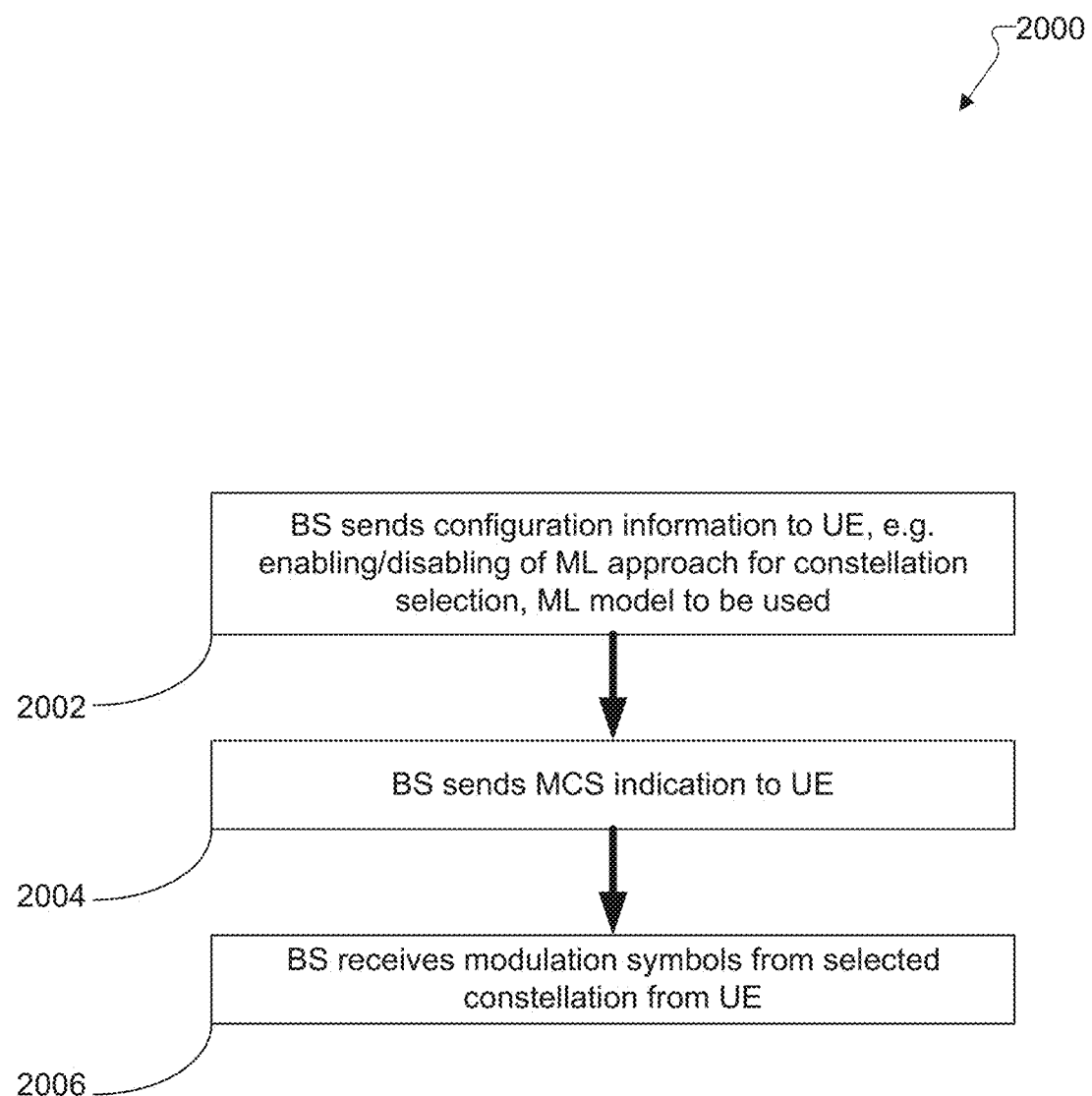
FIG. 27 illustrates an example method for operations of a BS to support UE-side ML-based MCS index-dependent constellations for a given modulation order according to embodiments of the present disclosure.

FIG. 27 illustrates an example method 2000 for operations of a BS to support UE-side ML-based MCS index-dependent constellations for a given modulation order according to embodiments of the present disclosure. At operation 2002, a BS sends configuration information to a UE, which can include ML-related configuration information such as enabling/disabling of an ML approach for different constellations depending on MCS index for a given modulation order, an ML model to be used, trained model parameters, and whether model parameter updates reported by the UE will be used or not. At operation 2004, the BS sends an MCS indication message to the UE. The BS can use an existing DCI format for this MCS indication message. It can also define a new DCI format for this MCS indication message. In one example, the UE uses this MCS indication message to determine an MCS index. In another example, the UE autonomously determines an MCS index. At operation 2006, the BS receives modulation symbols from the UE, which may have been selected from an ML-determined constellation corresponding to the MCS index.

Figure 28:
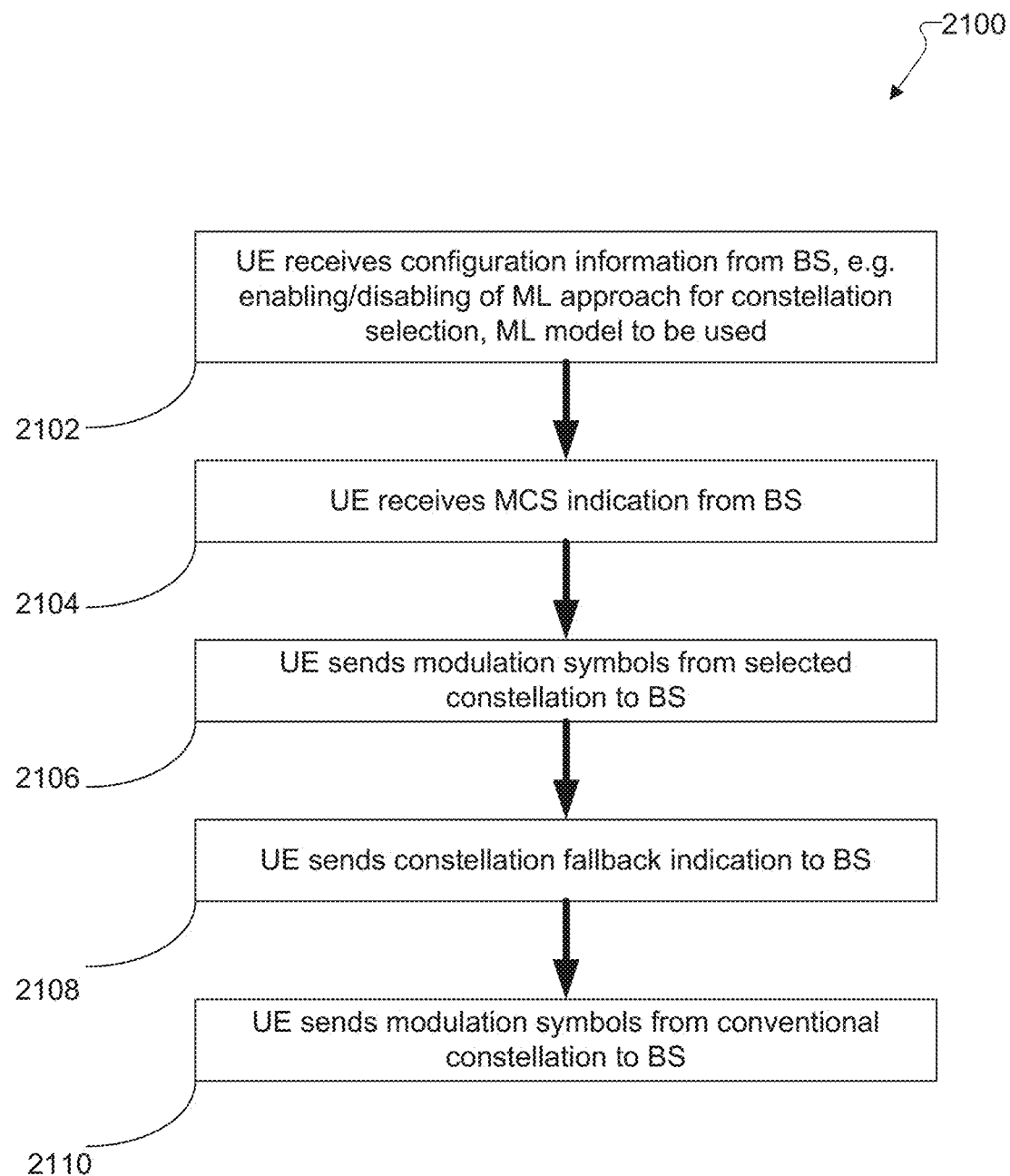
FIG. 28 illustrates an example method for operations of a UE to support a UE-initiated fallback to a conventional modulation method according to embodiments of the present disclosure.

FIG. 28 illustrates an example method 2100 for operations of a UE to support a UE-initiated fallback to a conventional modulation method according to embodiments of the present disclosure. At operation 2102, a UE receives configuration information from a BS, which can include ML-related configuration information such as enabling/disabling of an ML approach for different constellations depending on MCS index for a given modulation order, an ML model to be used, trained model parameters, and whether model parameter updates reported by the UE will be used or not. At operation 2104, the UE receives an MCS indication message from the BS. The BS can use an existing DCI format for this MCS indication message. It can also define a new DCI format for this MCS indication message. In one example, the UE uses this MCS indication message to determine an MCS index. In another example, the UE autonomously determines an MCS index. At operation 2106, the UE sends modulation symbols to the BS, which may have been selected from an ML-determined constellation corresponding to the MCS index. At operation 2108, the UE sends a message to the BS that corresponds to a request to fall back to a conventional modulation method. At operation 2110, the UE sends modulation symbols from a constellation for that conventional modulation method to the BS.

Figure 29:
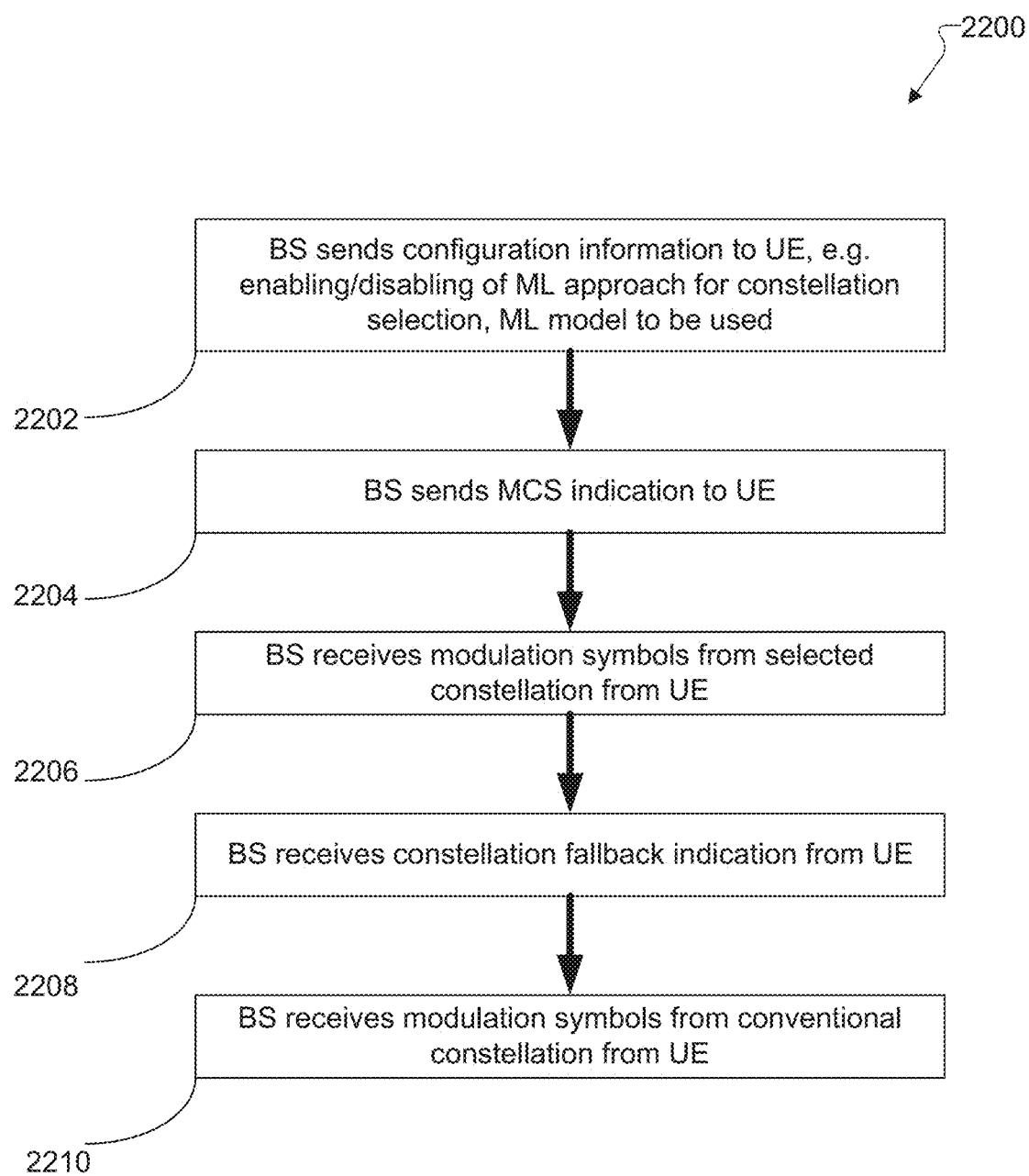
FIG. 29 illustrates an example method for operations of a BS to support a UE-initiated fallback to a conventional modulation method according to embodiments of the present disclosure.

FIG. 29 illustrates an example method 2200 for operations of a BS to support a UE-initiated fallback to a conventional modulation method according to embodiments of the present disclosure. At operation 2202, a BS sends configuration information to a UE, which can include ML-related configuration information such as enabling/disabling of an ML approach for different constellations depending on MCS index for a given modulation order, an ML model to be used, trained model parameters, and whether model parameter updates reported by the UE will be used or not. At operation 2204, the BS sends an MCS indication message to the UE. The BS can use an existing DCI format for this MCS indication message. It can also define a new DCI format for this MCS indication message. In one example, the UE uses this MCS indication message to determine an MCS index. In another example, the UE autonomously determines an MCS index. At operation 2206, the BS receives modulation symbols from the UE, which may have been selected from an ML-determined constellation corresponding to the MCS index. At operation 2208, the BS receives a message from the UE that corresponds to a request to fall back to a conventional modulation method. At operation 2210, the BS receives modulation symbols from a constellation for that conventional modulation method from the UE.

Figure 30:
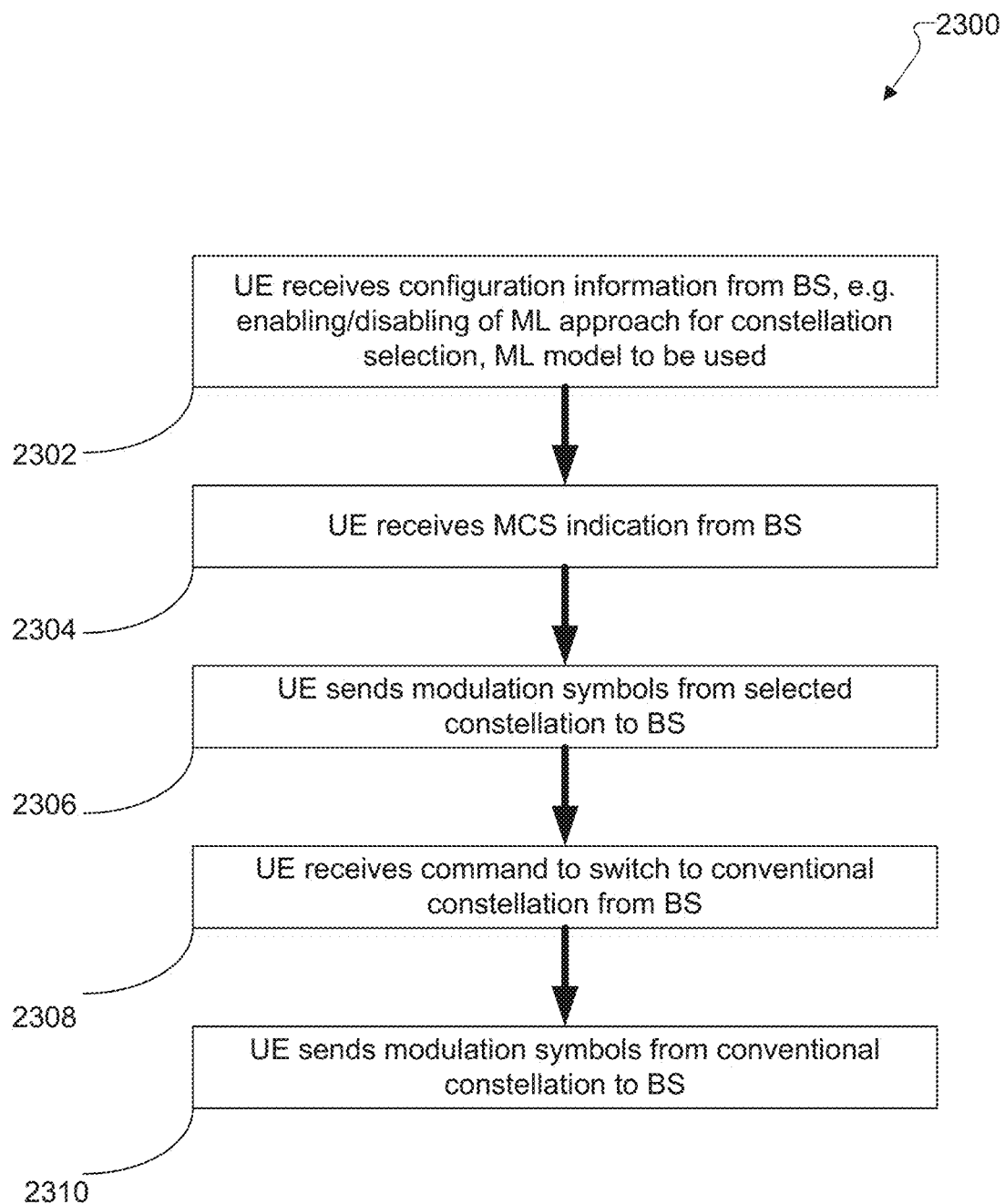
FIG. 30 illustrates an example method for operations of a UE to support a BS-initiated fallback to a conventional modulation method according to embodiments of the present disclosure.

FIG. 30 illustrates an example method 2300 for operations of a UE to support a BS-initiated fallback to a conventional modulation method according to embodiments of the present disclosure. At operation 2302, a UE receives configuration information from a BS, which can include ML-related configuration information such as enabling/disabling of an ML approach for different constellations depending on MCS index for a given modulation order, an ML model to be used, trained model parameters, and whether model parameter updates reported by the UE will be used or not. At operation 2304, the UE receives an MCS indication message from the BS. The BS can use an existing DCI format for this MCS indication message. It can also define a new DCI format for this MCS indication message. In one example, the UE uses this MCS indication message to determine an MCS index. In another example, the UE autonomously determines an MCS index. At operation 2306, the UE sends modulation symbols to the BS, which may have been selected from an ML-determined constellation corresponding to the MCS index. At operation 2308, the UE receives a message from the BS that corresponds to a command to fall back to a conventional modulation method. At operation 2310, the UE sends modulation symbols from a constellation for that conventional modulation method to the BS.

Figure 31:
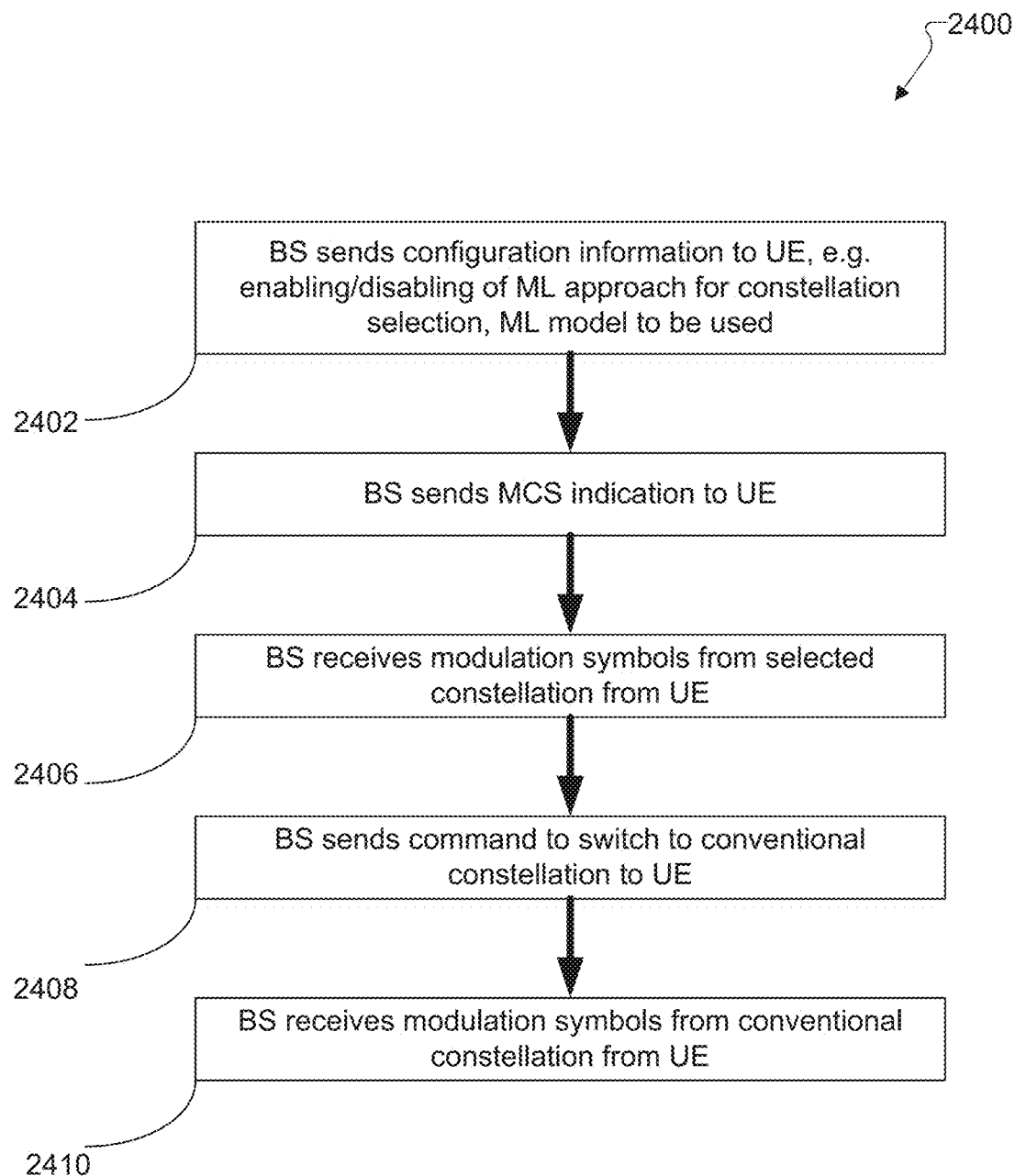
FIG. 31 illustrates an example method for operations of a BS to support a BS-initiated fallback to a conventional modulation method according to embodiments of the present disclosure.

FIG. 31 illustrates an example method 2400 for operations of a BS to support a BS-initiated fallback to a conventional modulation method according to embodiments of the present disclosure. At operation 2402, a BS sends configuration information to a UE, which can include ML-related configuration information such as enabling/disabling of an ML approach for different constellations depending on MCS index for a given modulation order, an ML model to be used, trained model parameters, and whether model parameter updates reported by the UE will be used or not. At operation 2404, the BS sends an MCS indication message to the UE. The BS can use an existing DCI format for this MCS indication message. It can also define a new DCI format for this MCS indication message. In one example, the UE uses this MCS indication message to determine an MCS index. In another example, the UE autonomously determines an MCS index. At operation 2406, the BS receives modulation symbols from the UE, which may have been selected from an ML-determined constellation corresponding to the MCS index. At operation 2408, the BS sends a message to the UE that corresponds to a command to fall back to a conventional modulation method. At operation 2410, the BS receives modulation symbols from a constellation for that conventional modulation method from the UE.

Figure 32:
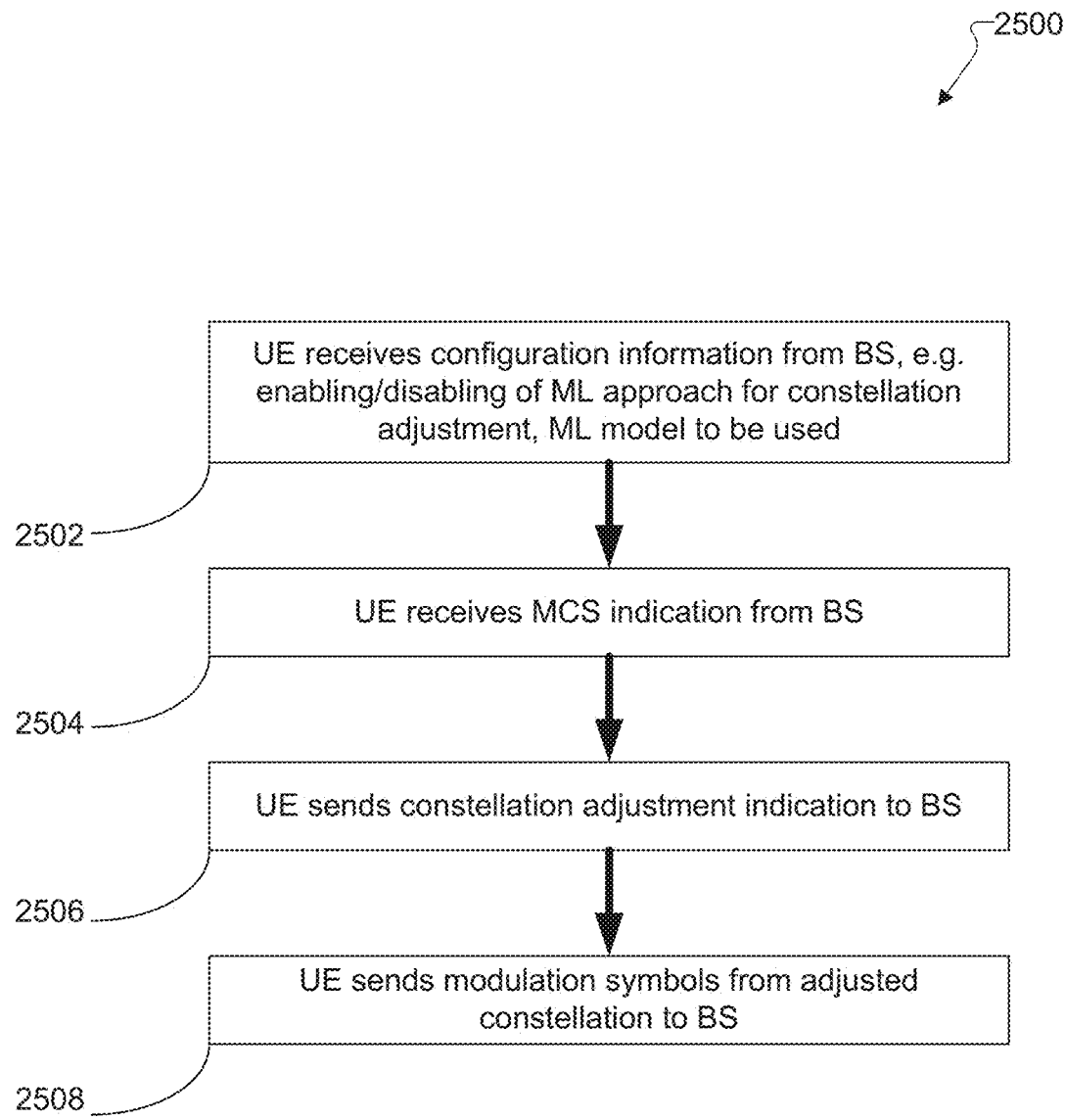
FIG. 32 illustrates an example method for operations of a UE to support UE-side ML-based constellation adjustment according to embodiments of the present disclosure.

FIG. 32 illustrates an example method 2500 for operations of a UE to support UE-side ML-based constellation adjustment according to embodiments of the present disclosure. At operation 2502, a UE receives configuration information from a BS, which can include ML-related configuration information such as enabling/disabling of an ML approach for constellation adjustment, an ML model to be used, trained model parameters, and whether model parameter updates reported by the UE will be used or not. At operation 2504, the UE receives an MCS indication from the BS. The BS can use an existing DCI format for this MCS indication message. It can also define a new DCI format for this MCS indication message. At operation 2506, the UE optionally sends a constellation adjustment indication to the BS. If the UE sends this constellation adjustment indication to the BS, then this indication corresponds to modulation symbols that the UE will send in a subsequent slot (possibly facilitating real-time demodulation). In one example, a dedicated/new MAC CE can be used for this indication, or an existing MAC control element (CE) can be used for this indication. In another example, this indication can be sent on the PUCCH or the PUSCH, where a new UCI format can be defined for this indication, or an existing UCI format can be used for this indication. If an existing UCI format is used for this indication, it can be included as a part of a UCI and therefore reported together with CSI feedback as, e.g., a 1-bit indication in a CSI report. At operation 2508, the UE uses an ML-based method to adjust a conventional constellation that corresponds to the MCS indication. It then sends modulation symbols from the adjusted constellation to the BS.

In another embodiment, a BS can pre-determine/configure information about the switching time to a modulation method based on an adjusted constellation. In this case, operation 2506 may be skipped. The UE can send modulation symbols from an adjusted constellation to the BS at a pre-determined/configured time in operation 2508.

In another embodiment, between operation 2506 and operation 2508, the UE can perform an operation 2507. In operation 2507, the UE can receive an ACK/NACK indication from the BS in response to a received constellation adjustment indication. If the UE receives an ACK, then the UE uses the adjusted constellation to generate modulation symbols. The UE sends these modulation symbols to the BS in operation 2508. If the UE receives a NACK, then the UE uses a conventional constellation to generate modulation symbols. The UE sends these modulation symbols to the BS in operation 2508. In operation 2507, in another embodiment, the UE can receive a configuration message for a constellation adjustment from the BS.

Figure 33:
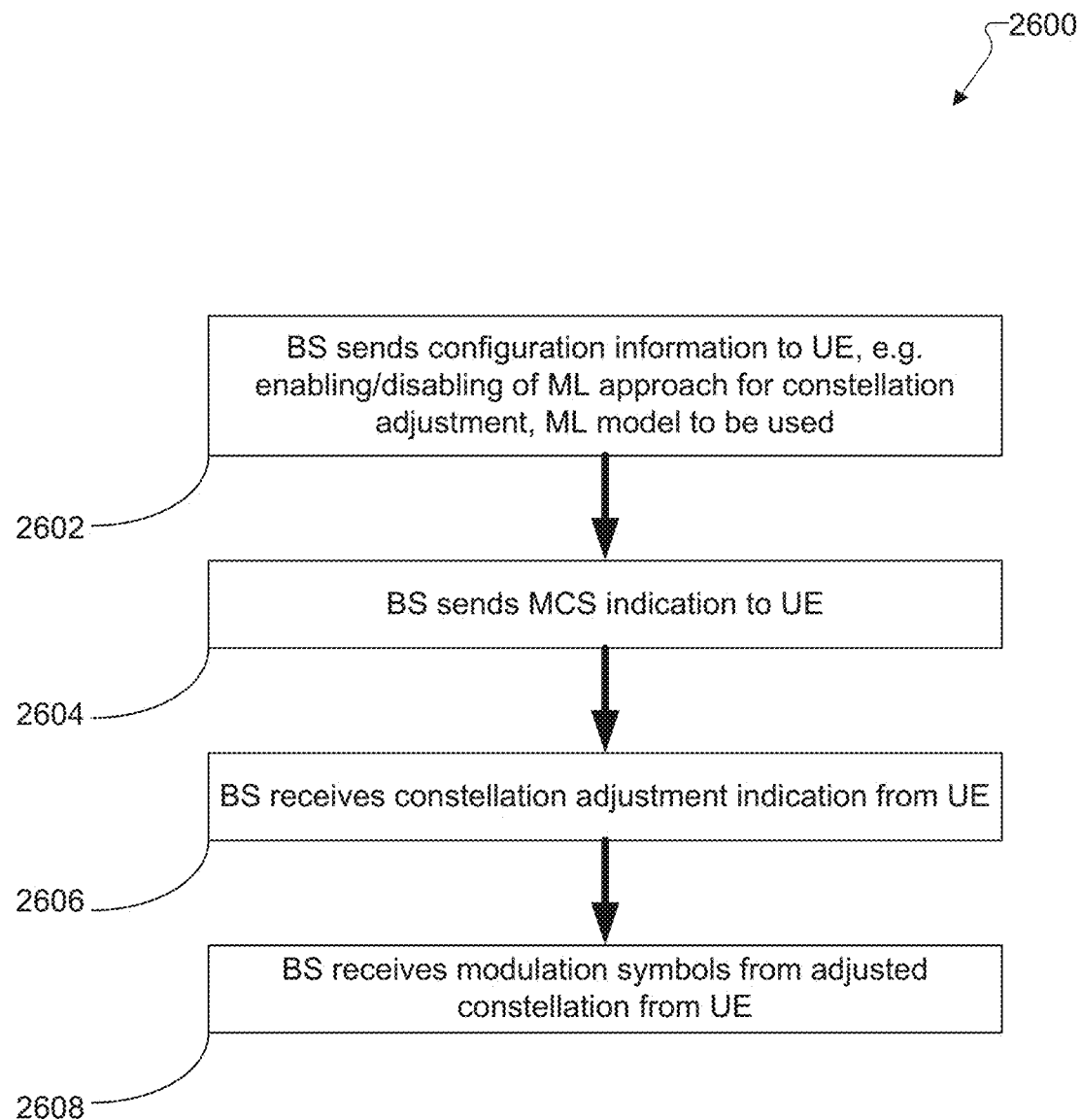
FIG. 33 illustrates an example method for operations of a BS to support UE-side ML-based constellation adjustment according to embodiments of the present disclosure.

FIG. 33 illustrates an example method 2600 for operations of a BS to support UE-side ML-based constellation adjustment according to embodiments of the present disclosure. At operation 2602, a BS sends configuration information to a UE, which can include ML-related configuration information such as enabling/disabling of an ML approach for constellation adjustment, an ML model to be used, trained model parameters, and whether model parameter updates reported by the UE will be used or not. At operation 2604, the BS sends an MCS indication to the UE. The BS can use an existing DCI format for this MCS indication message. It can also define a new DCI format for this MCS indication message. At operation 2606, the BS optionally receives a constellation adjustment indication from the UE. If the BS receives this constellation adjustment indication from the UE, then this indication corresponds to modulation symbols that the BS will receive in a subsequent slot (possibly facilitating real-time demodulation). In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of a UCI and therefore reported together with CSI feedback as, e.g., a 1-bit indication in a CSI report. At operation 2608, the BS receives modulation symbols from an adjusted constellation from the UE, where the UE uses an ML-based method to adjust a conventional constellation that corresponds to the MCS indication.

In another embodiment, the BS can pre-determine/configure information about the switching time to a modulation method based on an adjusted constellation. In this case, operation 2606 may be skipped. The BS can receive modulation symbols from an adjusted constellation from the UE at a pre-determined/configured time in operation 2608.

In another embodiment, between operation 2606 and operation 2608, the BS can perform an operation 2607. In operation 2607, the BS can send an ACK/NACK indication to the UE in response to a received constellation adjustment indication. If the BS sends an ACK, then the UE uses the adjusted constellation to generate modulation symbols. The BS receives these modulation symbols from the UE in operation 2608. If the BS sends a NACK, then the UE uses a conventional constellation to generate modulation symbols. The BS receives these modulation symbols from the UE in operation 2608. In operation 2607, in another embodiment, the BS can send a configuration message for a constellation adjustment to the UE.

Figure 34:
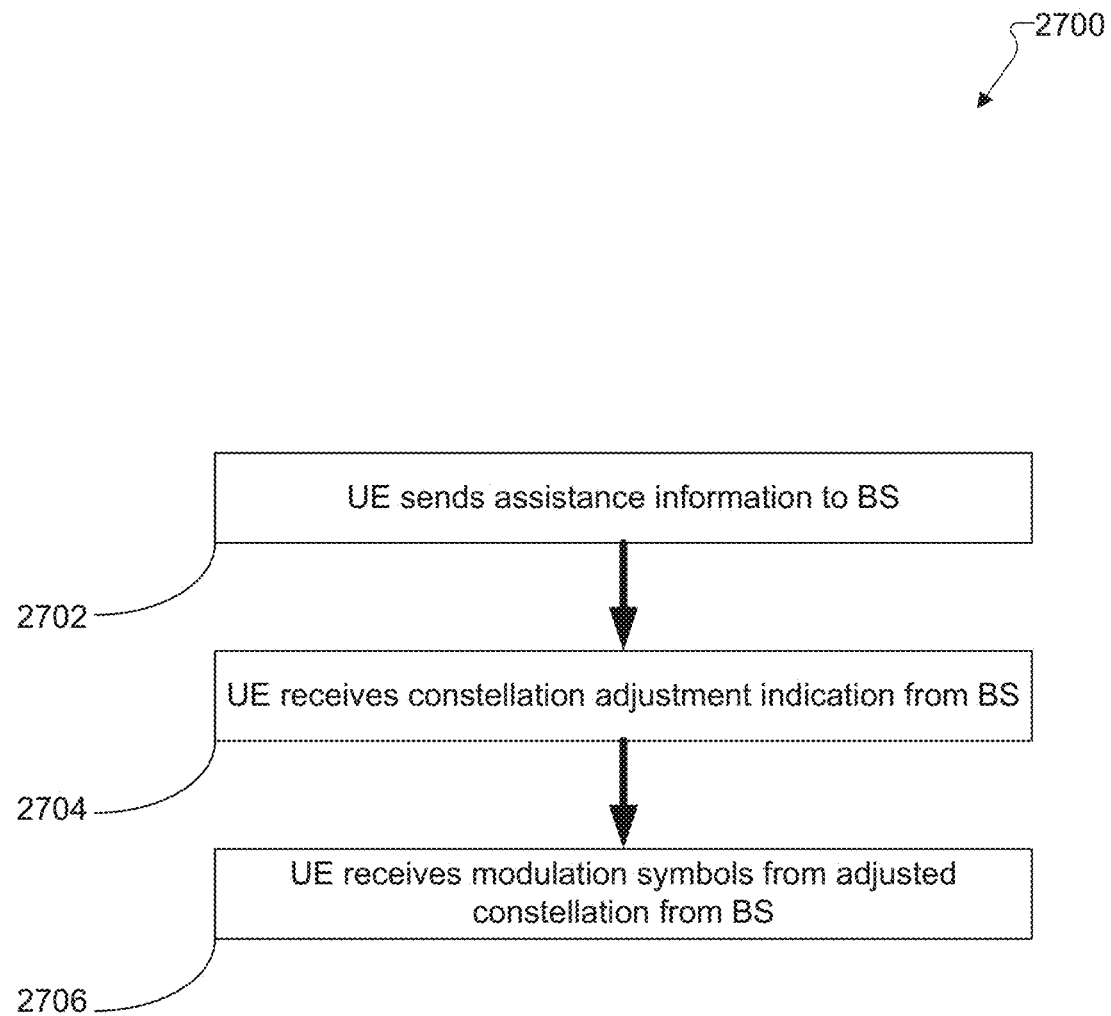
FIG. 34 illustrates an example method for operations of a UE to support UE-assisted constellation adjustment according to embodiments of the present disclosure.

FIG. 34 illustrates an example method 2700 for operations of a UE to support UE-assisted constellation adjustment according to embodiments of the present disclosure. At operation 2702, a UE sends assistance information to a BS. The assistance information can include a recommendation for a constellation adjustment, which is described further below. At operation 2704, the UE optionally receives a constellation adjustment indication from the BS. If the UE receives this constellation adjustment indication from the BS, then this indication corresponds to modulation symbols that the UE will receive in a subsequent slot (possibly facilitating real-time demodulation). In one example, a dedicated/new MAC CE can be used for this indication, or an existing MAC CE can be used for this indication. In another example, this indication can be sent on the PDCCH or the PDSCH, where a new DCI format can be defined for this indication, or an existing DCI format can be used for this indication. At operation 2706, the UE receives modulation symbols from an adjusted constellation from the BS.

Figure 35:
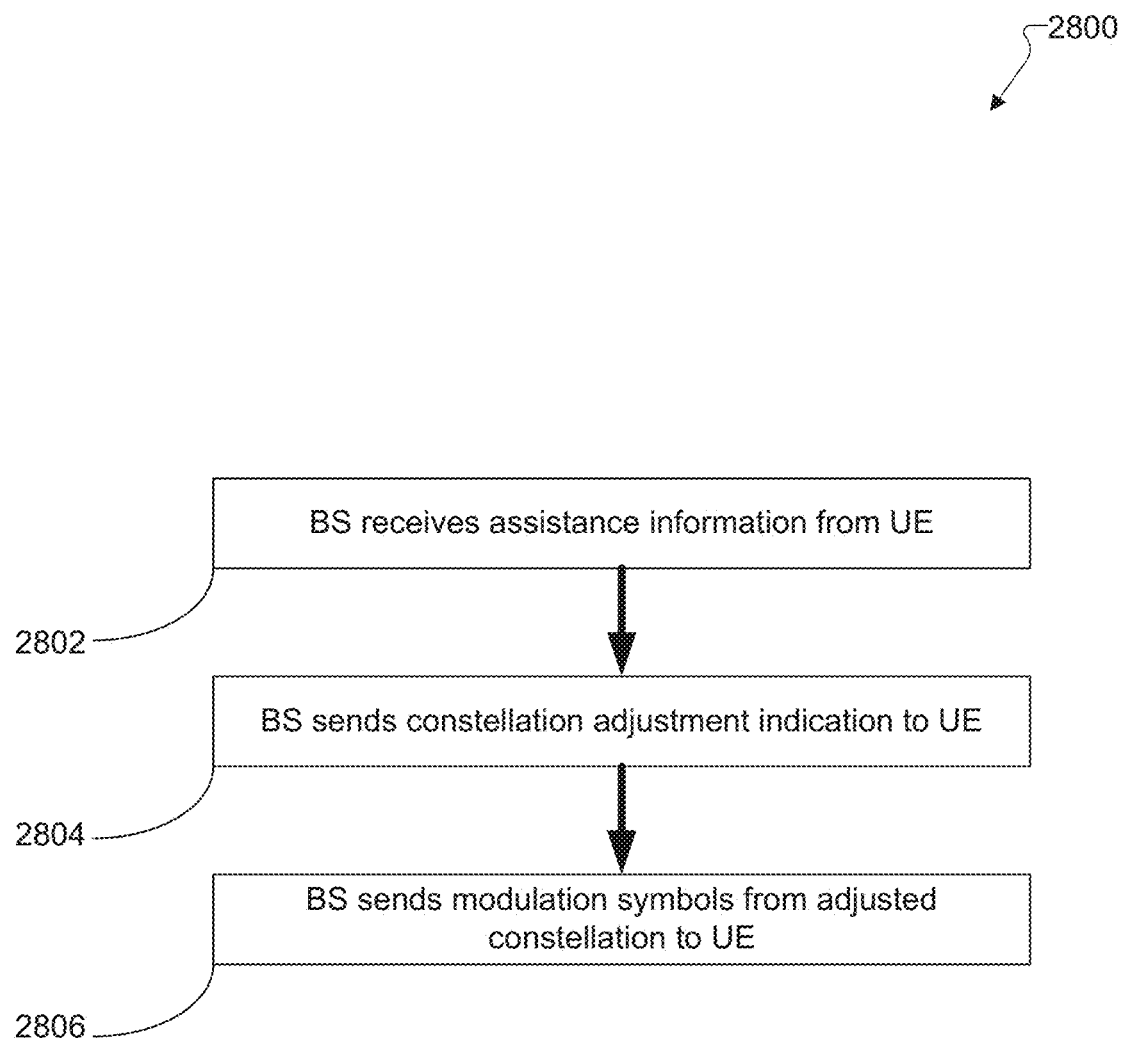
FIG. 35 illustrates an example method for operations of a BS to support UE-assisted constellation adjustment according to embodiments of the present disclosure.

FIG. 35 illustrates an example method 2800 for operations of a BS to support UE-assisted constellation adjustment according to embodiments of the present disclosure. At operation 2802, a BS receives assistance information from a UE. The assistance information can include a recommendation for a constellation adjustment, which is described further below. At operation 2804, the BS optionally sends a constellation adjustment indication to the UE. If the BS sends this constellation adjustment indication to the UE, then this indication corresponds to modulation symbols that the BS will send in a subsequent slot (facilitating real-time demodulation). In one example, a dedicated/new MAC CE can be used for this indication, or an existing MAC CE can be used for this indication. In another example, this indication can be sent on the PDCCH or the PDSCH, where a new DCI format can be defined for this indication, or an existing DCI format can be used for this indication. At operation 2806, the BS sends modulation symbols from an adjusted constellation to the UE.

Figure 36:
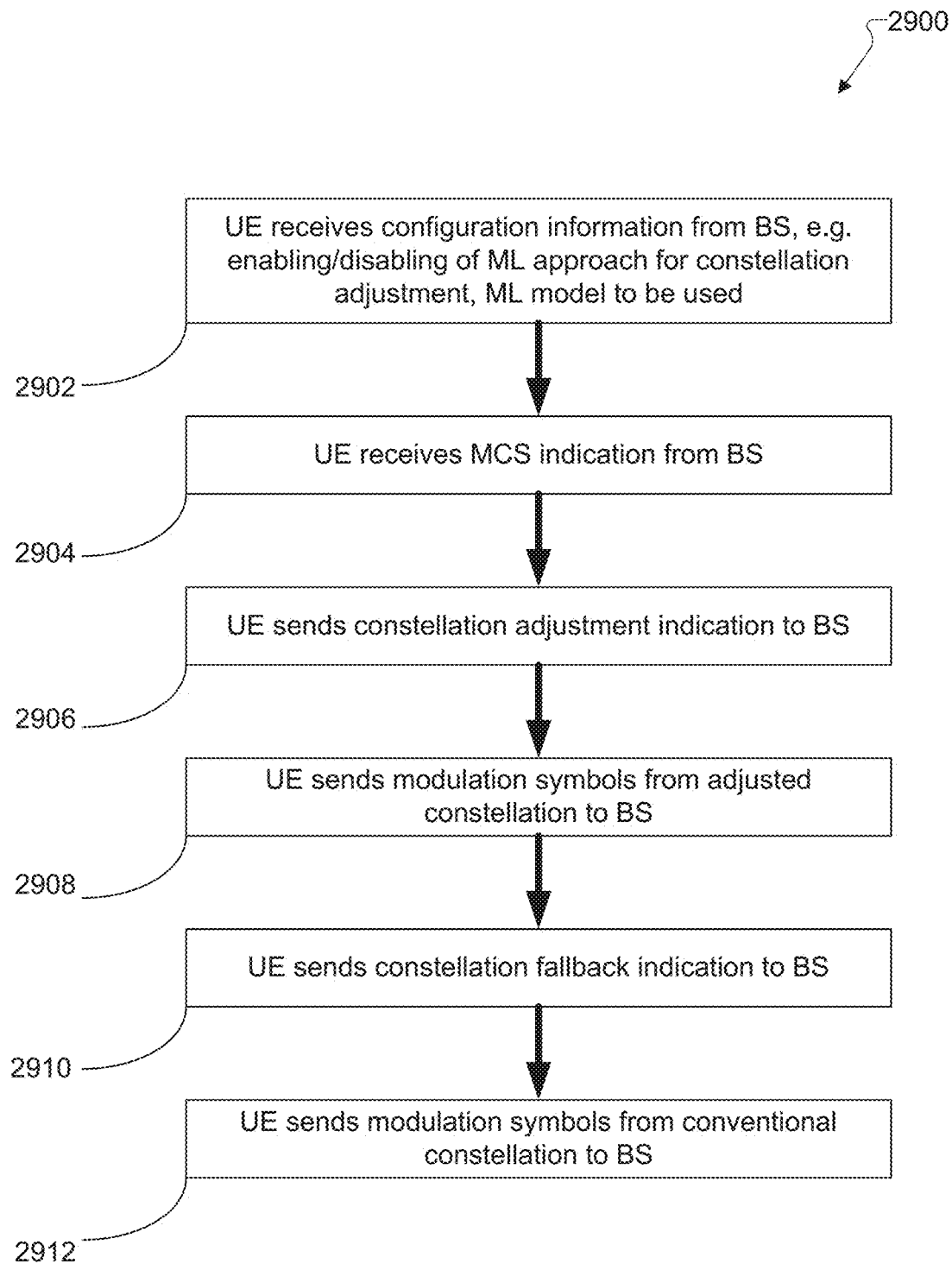
FIG. 36 illustrates an example method for operations of a UE to support UE-initiated fallback to a conventional constellation according to embodiments of the present disclosure.

FIG. 36 illustrates an example method 2900 for operations of a UE to support UE-initiated fallback to a conventional constellation according to embodiments of the present disclosure. At operation 2902, a UE receives configuration information from the BS, which can include ML-related configuration information such as enabling/disabling of an ML approach for constellation adjustment, an ML model to be used, trained model parameters, and whether model parameter updates reported by the UE will be used or not. At operation 2904, the UE receives an MCS indication from the BS. The BS can use an existing DCI format for this MCS indication message. It can also define a new DCI format for this MCS indication message. At operation 2906, the UE optionally sends a constellation adjustment indication to the BS. If the UE sends this constellation adjustment indication to the BS, then this indication corresponds to modulation symbols that the UE will send in a subsequent slot (facilitating real-time demodulation). In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of a UCI and therefore reported together with CSI feedback as, e.g., a 1-bit indication in a CSI report. At operation 2908, the UE uses an ML-based method to adjust a conventional constellation that corresponds to the MCS indication. It then sends modulation symbols from the adjusted constellation to the BS. At operation 2910, the UE sends a message to the BS that corresponds to a request to fall back to a conventional constellation. At operation 2912, the UE sends modulation symbols from the conventional constellation to the BS.

In another embodiment, the BS can pre-determine/configure information about the switching time to a modulation method based on an adjusted constellation. In this case, operation 2906 may be skipped. The UE can send modulation symbols from an adjusted constellation to the BS at a pre-determined/configured time in operation 2908.

In another embodiment, between operation 2906 and operation 2908, the UE can perform an operation 2907. In operation 2907, the UE can receive an ACK/NACK indication from the BS in response to a received constellation adjustment indication. If the UE receives an ACK, then the UE uses the adjusted constellation to generate modulation symbols. The UE sends these modulation symbols to the BS in operation 2908. If the UE receives a NACK, then the UE uses a conventional constellation to generate modulation symbols. The UE sends these modulation symbols to the BS in operation 2908. In operation 2907, in another embodiment, the UE can receive a configuration message for a constellation adjustment from the BS.

Figure 37:
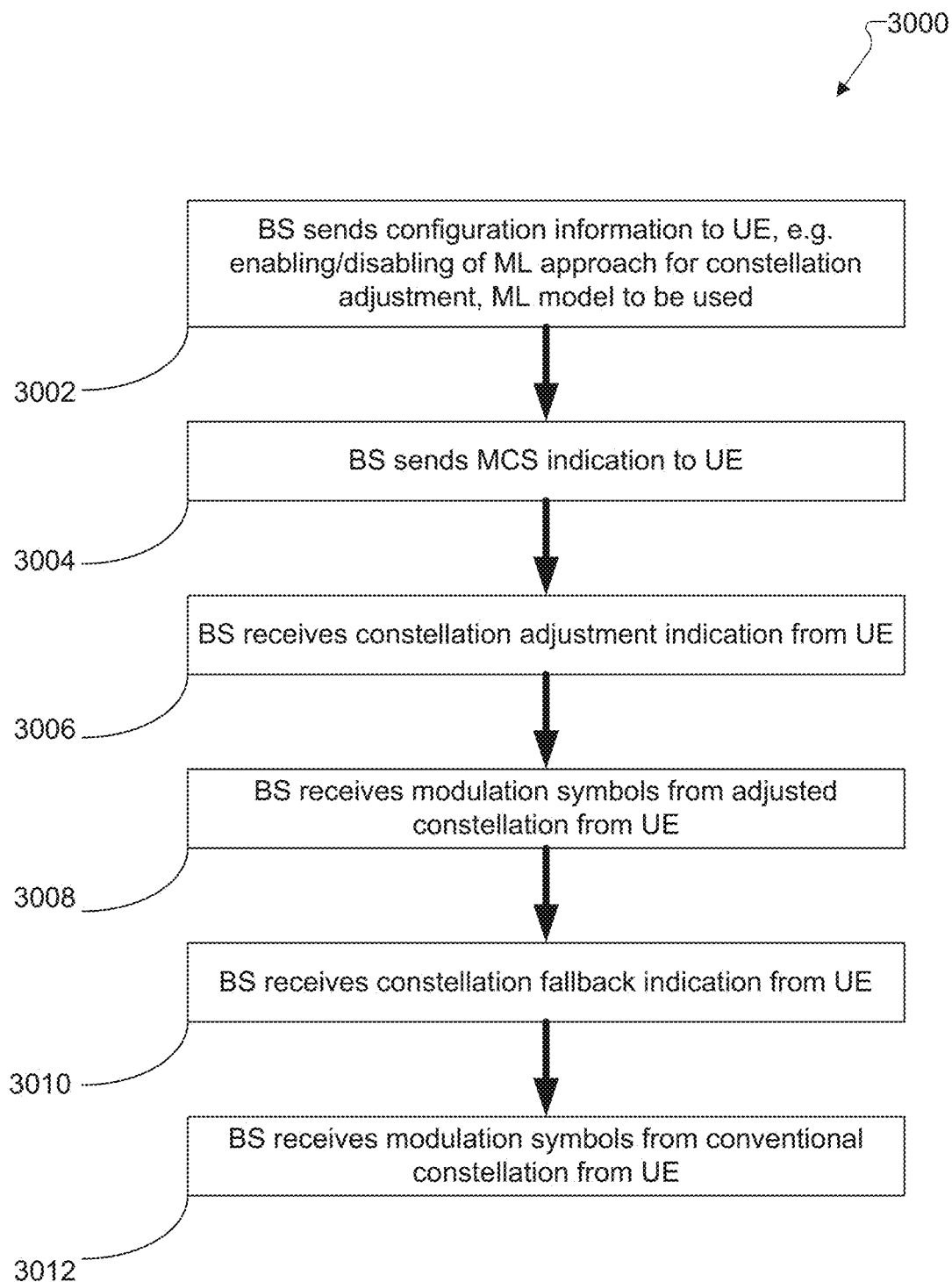
FIG. 37 illustrates an example method for operations of a BS to support UE-initiated fallback to a conventional constellation according to embodiments of the present disclosure.

FIG. 37 illustrates an example method 3000 for operations of a BS to support UE-initiated fallback to a conventional constellation according to embodiments of the present disclosure. At operation 3002, a BS sends configuration information to a UE, which can include ML-related configuration information such as enabling/disabling of an ML approach for constellation adjustment, an ML model to be used, trained model parameters, and whether model parameter updates reported by the UE will be used or not. At operation 3004, the BS sends an MCS indication to the UE. The BS can use an existing DCI format for this MCS indication message. It can also define a new DCI format for this MCS indication message. At operation 3006, the BS optionally receives a constellation adjustment indication from the UE. If the BS receives this constellation adjustment indication from the UE, then this indication corresponds to modulation symbols that the BS will receive in a subsequent slot (facilitating real-time demodulation). In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of a UCI and therefore reported together with CSI feedback as, e.g., a 1-bit indication in a CSI report. At operation 3008, the BS receives modulation symbols from an adjusted constellation from the UE, where the UE uses an ML-based method to adjust a conventional constellation that corresponds to the MCS indication. At operation 3010, the BS receives a message from the UE that corresponds to a request to fall back to a conventional constellation. At operation 3012, the BS receives modulation symbols from the conventional constellation from the UE.

In another embodiment, the BS can pre-determine/configure information about the switching time to a modulation method based on an adjusted constellation. In this case, operation 3006 may be skipped. The BS can receive modulation symbols from an adjusted constellation from the UE at a pre-determined/configured time in operation 3008.

In another embodiment, between operation 3006 and operation 3008, the BS can perform an operation 3007. In operation 3007, the BS can send an ACK/NACK indication to the UE in response to a received constellation adjustment indication. If the BS sends an ACK, then the UE uses the adjusted constellation to generate modulation symbols. The BS receives these modulation symbols from the UE in operation 3008. If the BS sends a NACK, then the UE uses a conventional constellation to generate modulation symbols. The BS receives these modulation symbols from the UE in operation 3008. In operation 3007, in another embodiment, the BS can send a configuration message for a constellation adjustment to the UE.

Figure 38:
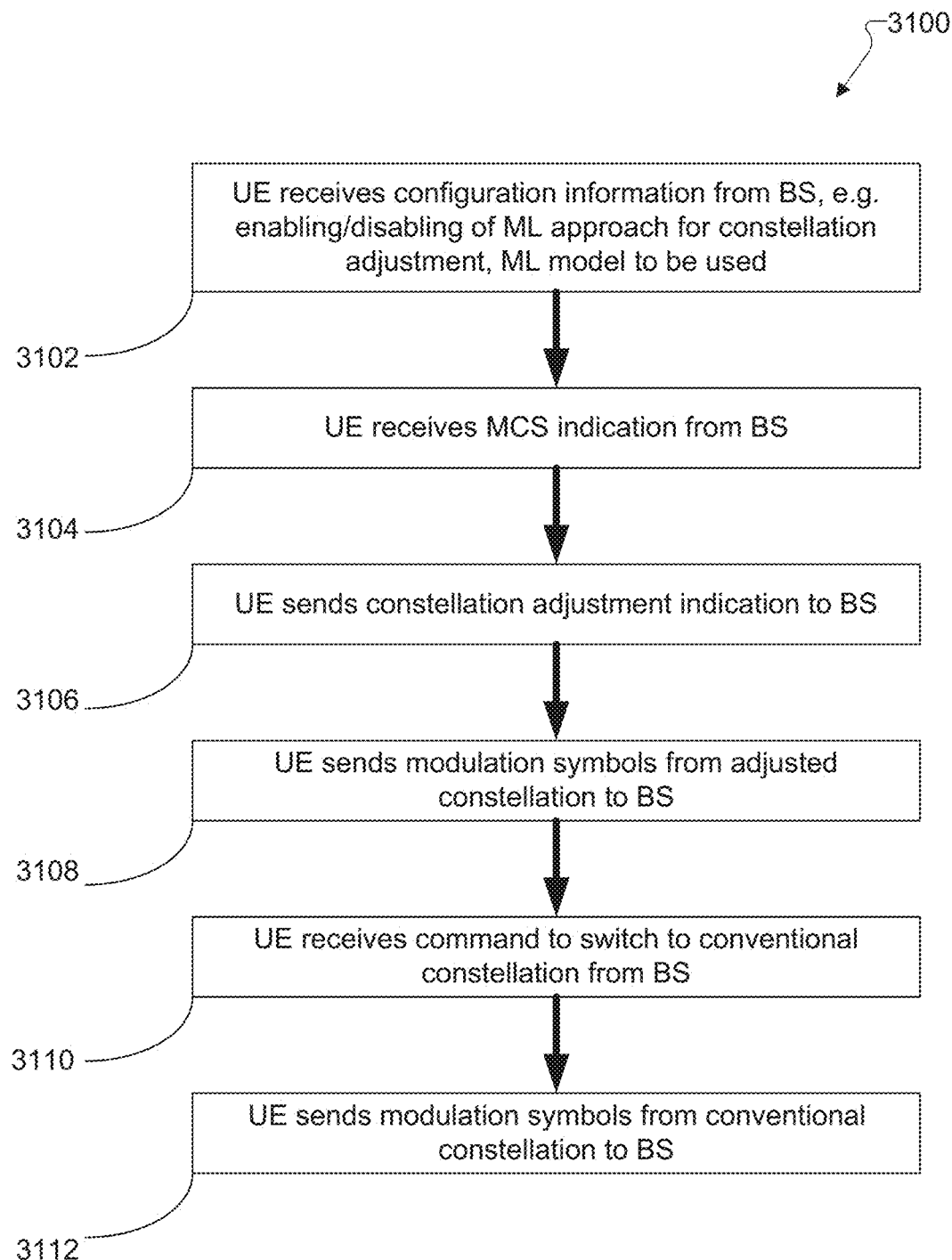
FIG. 38 illustrates an example method for operations of a UE to support BS-initiated fallback to a conventional constellation according to embodiments of the present disclosure.

FIG. 38 illustrates an example method 3100 for operations of a UE to support BS-initiated fallback to a conventional constellation according to embodiments of the present disclosure. At operation 3102, a UE receives configuration information from a BS, which can include ML-related configuration information such as enabling/disabling of an ML approach for constellation adjustment, an ML model to be used, trained model parameters, and whether model parameter updates reported by the UE will be used or not. At operation 3104, the UE receives an MCS indication from the BS. The BS can use an existing DCI format for this MCS indication message. It can also define a new DCI format for this MCS indication message. At operation 3106, the UE optionally sends a constellation adjustment indication to the BS. If the UE sends this constellation adjustment indication to the BS, then this indication corresponds to modulation symbols that the UE will send in a subsequent slot (facilitating real-time demodulation). In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of a UCI and therefore reported together with CSI feedback as, e.g., a 1-bit indication in a CSI report. At operation 3108, the UE uses an ML-based method to adjust a conventional constellation that corresponds to the MCS indication. It then sends modulation symbols from the adjusted constellation to the BS. At operation 3110, the UE receives a message from the BS that corresponds to a command to fall back to a conventional constellation. At operation 3112, the UE sends modulation symbols from the conventional constellation to the BS.

In another embodiment, the BS can pre-determine/configure information about the switching time to a modulation method based on an adjusted constellation. In this case, operation 3106 may be skipped. The UE can send modulation symbols from an adjusted constellation to the BS at a pre-determined/configured time in operation 3108.

In another embodiment, between operation 3106 and operation 3108, the UE can perform an operation 3107. In operation 3107, the UE can receive an ACK/NACK from the BS in response to a received constellation adjustment indication. If the UE receives an ACK, then the UE uses the adjusted constellation to generate modulation symbols. The UE sends these modulation symbols to the BS in operation 3108. If the UE receives a NACK, then the UE uses a conventional constellation to generate modulation symbols. The UE sends these modulation symbols to the BS in operation 3108. In operation 3107, in another embodiment, the UE can receive a configuration message for a constellation adjustment from the BS.

Figure 39:
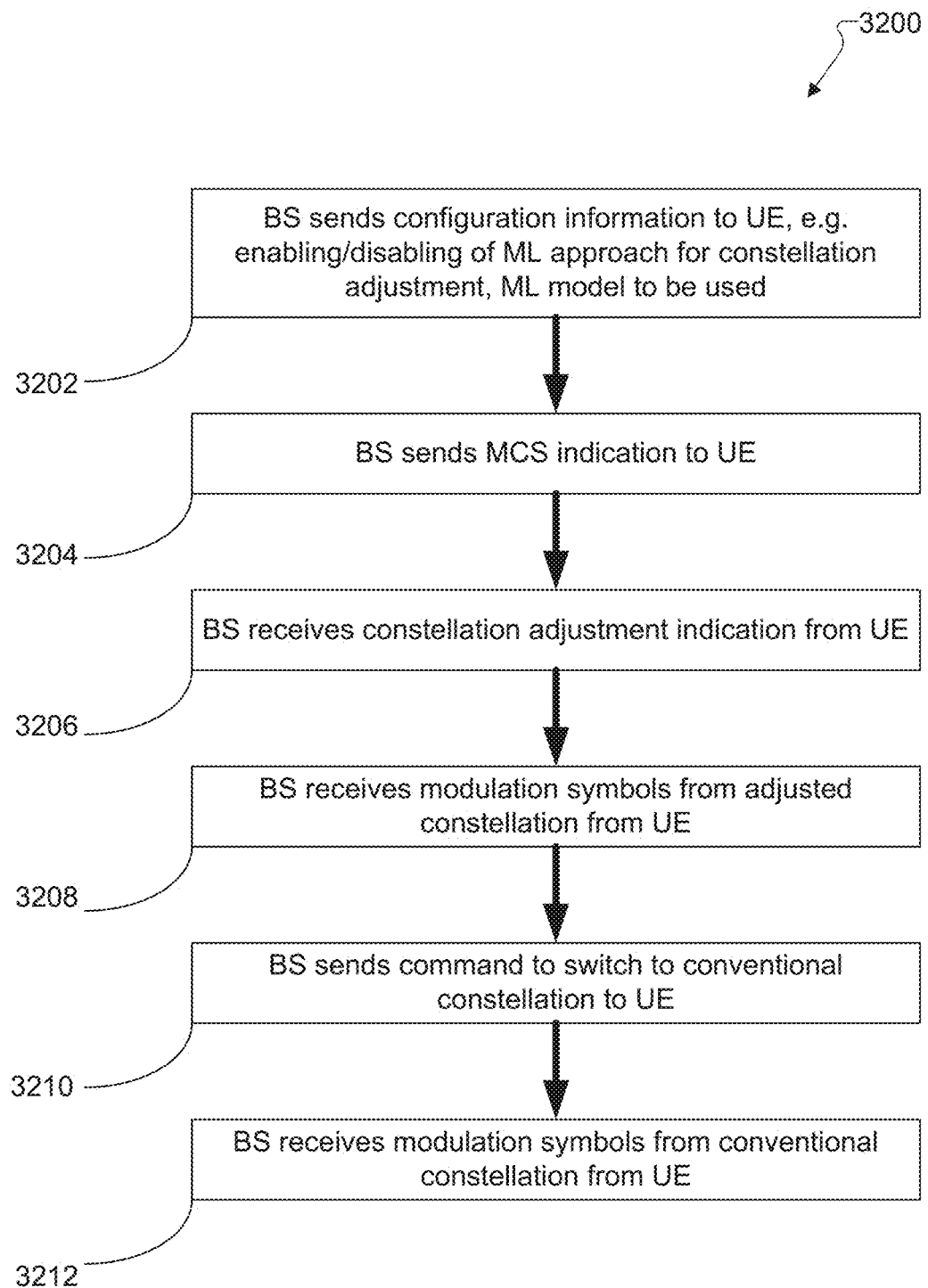
FIG. 39 illustrates an example method for operations of a BS to support BS-initiated fallback to a conventional constellation according to embodiments of the present disclosure.

FIG. 39 illustrates an example method 3200 for operations of a BS to support BS-initiated fallback to a conventional constellation according to embodiments of the present disclosure. At operation 3202, a BS sends configuration information to a UE, which can include ML-related configuration information such as enabling/disabling of an ML approach for constellation adjustment, an ML model to be used, trained model parameters, and whether model parameter updates reported by the UE will be used or not. At operation 3204, the BS sends an MCS indication to the UE. The BS can use an existing DCI format for this MCS indication message. It can also define a new DCI format for this MCS indication message. At operation 3206, the BS optionally receives a constellation adjustment indication from the UE. If the BS receives this constellation adjustment indication from the UE, then this indication corresponds to modulation symbols that the BS will receive in a subsequent slot (facilitating real-time demodulation). In one example, a dedicated/new MAC CE can be used for this indication, or an existing MAC CE can be used for this indication. In another example, this indication can be sent on the PUCCH or the PUSCH, where a new UCI format can be defined for this indication, or an existing UCI format can be used for this indication. If an existing UCI format is used for this indication, it can be included as a part of a UCI and therefore reported together with CSI feedback as, e.g., a 1-bit indication in a CSI report. At operation 3208, the BS receives modulation symbols from an adjusted constellation from the UE, where the UE uses an ML-based method to adjust a conventional constellation that corresponds to the MCS indication. At operation 3210, the BS sends a message to the UE that corresponds to a command to fall back to a conventional constellation. At operation 3212, the BS receives modulation symbols from the conventional constellation from the UE.

In another embodiment, the BS can pre-determine/configure information about the switching time to a modulation method based on an adjusted constellation. In this case, operation 3206 may be skipped. The BS can receive modulation symbols from an adjusted constellation from the UE at a pre-determined/configured time in operation 3208.

In another embodiment, between operation 3206 and operation 3208, the BS can perform an operation 3207. In operation 3207, the BS can send an ACK/NACK indication to the UE in response to a received constellation adjustment indication. If the BS sends an ACK, then the UE uses the adjusted constellation to generate modulation symbols. The BS receives these modulation symbols from the UE in operation 3208. If the BS sends a NACK, then the UE uses a conventional constellation to generate modulation symbols. The BS receives these modulation symbols from the UE in operation 3208. In operation 3207, in another embodiment, the BS can send a configuration message for a constellation adjustment to the UE.

Figure 40:
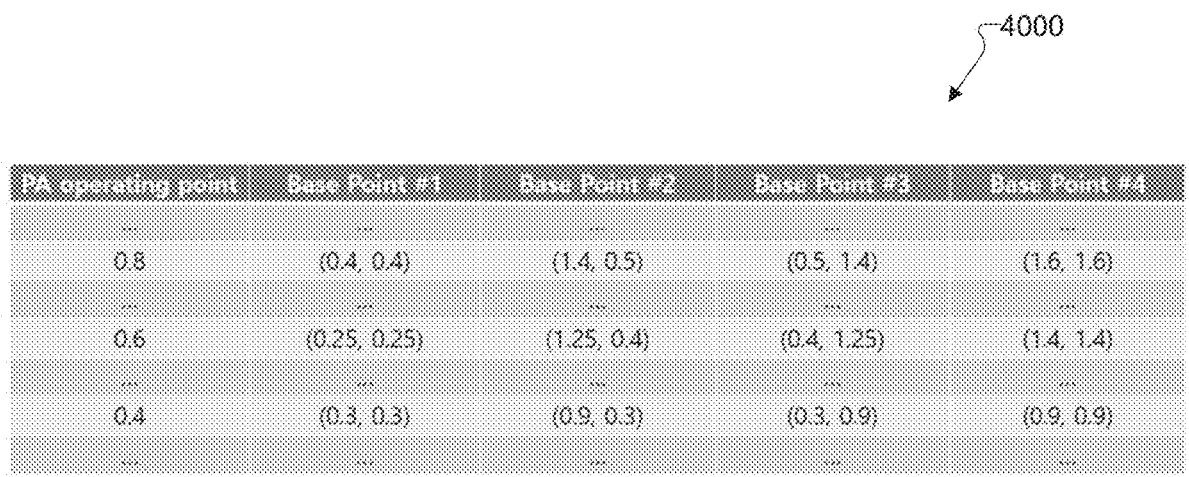
FIG. 40 illustrates an example lookup table for facilitating determination of a modulation method based on a PA operating point according to embodiments of the present disclosure.

FIG. 40 illustrates an example lookup table 4000 for facilitating determination of a modulation method based on a PA operating point according to embodiments of the present disclosure. The example lookup table 4000 may be used to support selection, by an adjusted modulator, of different constellations depending on PA operating point for a given modulation order. In this example, each PA operating point maps to a set of 4 "base points". Each of these base points lies in the first quadrant of the complex plane. These "base points" can be reflected about the real and imaginary axes of the complex plane to obtain all of the points for a given constellation of size 16. A device can then use this set of 16 points to modulate encoded bits.

In some embodiments, as discussed above, a new MAC CE can be defined for the UE assistance information report. This MAC CE can be identified by a MAC subheader with a logical channel ID. This MAC CE can have a variable size and can comprise the following fields:

Block Error Rate: This field indicates the observed block error rate of the UE, e.g., the block error rate that has been computed over the last 1000 received transport blocks.

Throughput: This field indicates the observed throughput of the UE, e.g., the throughput in megabits/second that has been computed over the last 1000 received transport blocks.

Estimated Coherence Time: This field indicates the UE's estimate of the DL channel coherence time in milliseconds.

Estimated Coherence Bandwidth: This field indicates the UE's estimate of the DL channel coherence bandwidth in kilohertz.

IR1: This field indicates the presence of the octet(s) containing the Recommended Constellation field. If the IR1 field is set to 1, the octet(s) containing the Recommended Constellation field is (are) present. If the IR1 field is set to 0, the octet(s) containing the Recommended Constellation field is (are) not present.

Recommended Constellation: This field indicates the UE's recommended constellation for generating modulation symbols, e.g., an index to a table of pre-defined constellations, a list of ((Re, Im) and/or rotation angles) adjustments to points in a pre-defined constellation, etc.

IR2: This field indicates the presence of the octet containing the Recommended (UE) Backoff field. If the IR2 field is set to 1, the octet containing the Recommended (UE) Backoff field is present. If the IR2 field is set to 0, the octet containing the Recommended (UE) Backoff field is not present.

Recommended (UE) Backoff: This field indicates the UE's recommendation for its PA back-off value (e.g., as measured in dBm), which could indicate its recommended PA operating point.

Figure 41:
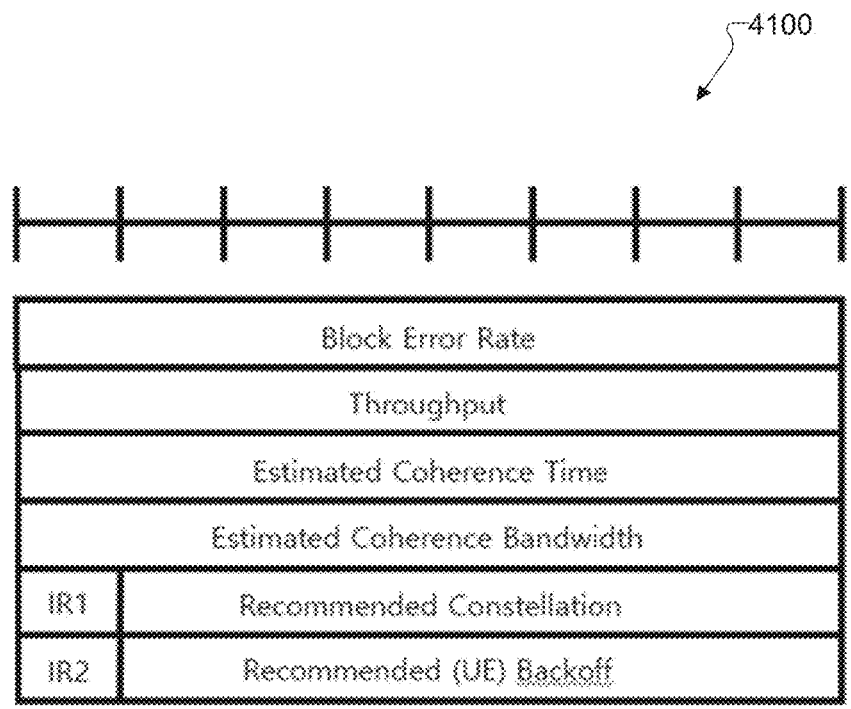
FIG. 41 illustrates an example format of a new MAC CE for the UE assistance information report according to embodiments of the present disclosure.

FIG. 41 illustrates an example format 4100 of a new MAC CE for the UE assistance information report according to embodiments of the present disclosure. In this example, the Block Error Rate, UE Throughput, Estimated Coherence Time, and Estimated Coherence Bandwidth fields each have a length of 8 bits. The Recommended Constellation and the Recommended (UE) Backoff fields each have a length of 7 bits.

FIG. 42 illustrates an example modified PDSCH-ServingCellConfig IE 4200 according to embodiments of the present disclosure. In some embodiments, a BS can configure a UE to train an AI/ML-based method for constellation selection/adjustment via RRC configuration. The example PDSCH-ServingCellConfig IE 4200 is modified to configure training of an AI/ML-based method for constellation selection/adjustment. In this example, mlParams, if present, can include at least one set of mlTrainParams, and each set of mlTrainParams can include trained weights and biases for another UE that has trained an AI/ML-based method for constellation selection/adjustment. These trained weights and biases can assist this UE in training an AI/ML-based method for constellation selection/adjustment.

In one embodiment, the PDSCH-ServingCellConfig IE can include training/inference assistance information from other UEs, including training error (e.g., NMSE), hyperparameters (e.g., learning rate, number of training epochs, split between training and testing data, etc.), or the like.

Figure 43:
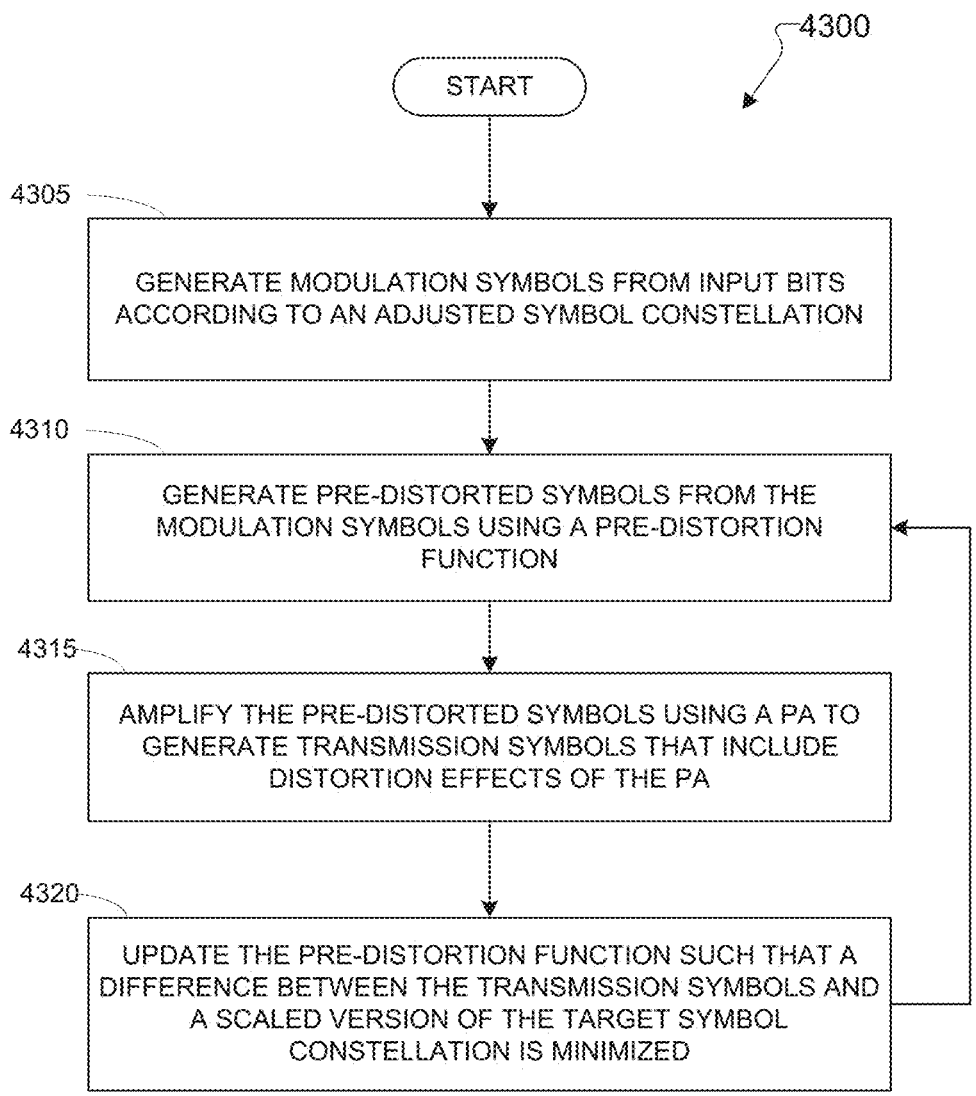
FIG. 43 illustrates an example process for symbol modulation that accounts for distortion introduced by a PA in a wireless transmission device according to various embodiments of the present disclosure.

FIG. 43 illustrates an example process 4300 for symbol modulation that accounts for distortion introduced by a PA in a wireless transmission device according to various embodiments of the present disclosure. The process 4300 of FIG. 43 is performed by a wireless device that includes a transmitter comprising a modulator, a DPD, and a PA. For convenience, the process 4300 of FIG. 43 will be described as performed by a UE (e.g., a 5G/NR UE 116), but it is understood that the process 4300 may be performed by a 5G/NR base station (e.g., a gNB 102) or by any other suitable wireless communication device (e.g., 6G and beyond devices).

Beginning at step 4305, the UE generates modulation symbols from input bits according to an adjusted symbol constellation. This may be done with a modulator (or adjusted modulator) in the UE. The input bits may be encoded bits generated by a bit generator.

Next, the UE generates pre-distorted symbols from the modulation symbols (step 4310). This may be done with a DPD using a pre-distortion function.

The UE then amplifies the pre-distorted symbols using a PA to generate transmission symbols that include distortion effects of the PA (step 4315). Referring to step 4305, the adjusted symbol constellation is adjusted from a target symbol constellation such that the generated modulation symbols pre-compensate for the distortion effects. Referring to step 4310, the pre-distortion function is designed to further pre-compensate for the distortion effects.

The UE next updates the pre-distortion function such that a difference between the transmission symbols and a scaled version of the target symbol constellation is reduced or minimized (step 4320). The UE may then return to step 4310 and generate updated pre-distorted symbols using the updated pre-distortion function, and amplify those updated pre-distorted symbols at step 4315. The loop of steps 4310-4320 may continue until a condition is met (e.g., the difference between the transmission symbols and the scaled version of the target symbol constellation is below some pre-determined threshold), at which point the transmission symbols are ready to transmit.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a modulator configured to generate modulation symbols from input bits according to an adjusted symbol constellation;
   a digital pre-distorter (DPD) operably coupled to the modulator and configured to generate pre-distorted symbols; and
   a power amplifier (PA) operably coupled to the DPD and configured to amplify the pre-distorted symbols to generate transmission symbols that include distortion effects of the PA, wherein the adjusted symbol constellation is adjusted from a target symbol constellation such that the generated modulation symbols pre-compensate for the distortion effects,
wherein the modulator is further configured to select the adjusted symbol constellation from a set of symbol constellations based on an operating point of a power amplifier (PA), and
wherein the DPD is further configured to:
generate the pre-distorted symbols from the modulation symbols using a pre-distortion function to further pre-compensate for the distortion effects; and
update the pre-distortion function such that a difference between the transmission symbols and a scaled version of the target symbol constellation is reduced.

2. The UE of claim 1, wherein the modulator is further configured to select the adjusted symbol constellation from the set of symbol constellations based on the operating point of the PA such that the generated modulation symbols pre-compensate for the distortion effects of the PA at that operating point.

3. The UE of claim 1, further comprising:
an envelope tracker (ET) operably coupled to the DPD, the modulator, and the PA, the ET configured to determine an updated operating point for the PA based on the pre-distorted symbols,
wherein the modulator is further configured to select the adjusted symbol constellation based on the updated operating point and generate the modulation symbols for the updated operating point such that they pre-compensate for the distortion effects of the PA at the updated operating point.

4. The UE of claim 3, wherein:
the DPD is further configured to generate the pre-distorted symbols for the updated operating point based on the modulation symbols for the updated operating point, and the ET is further configured to determine a supply voltage for the PA based on the pre-distorted symbols for the updated operating point.

5. The UE of claim 1, wherein:
the pre-distortion function is a generalized memory polynomial (GMP) model, and
the DPD is configured to update coefficients of the GMP model such that the difference between the transmission symbols and the scaled version of the target symbol constellation is reduced.

6. The UE of claim 1, wherein:
the distortion effects of the PA comprise nonlinear effects and memory effects,
the adjusted symbol constellation at least partially pre-compensates for the nonlinear effects, and
the pre-distortion function pre-compensates for at least the memory effects.

7. The UE of claim 1, wherein the adjusted symbol constellation is generated such that a loss function between the transmission symbols and the scaled version of the target symbol constellation is reduced.

8. A base station (BS) comprising:
a modulator configured to generate modulation symbols from input bits according to an adjusted symbol constellation;
a digital pre-distorter (DPD) operably coupled to the modulator and configured to generate pre-distorted symbols; and a power amplifier (PA) operably coupled to the DPD and configured to amplify the pre-distorted symbols to generate transmission symbols that include distortion effects of the PA,
wherein the adjusted symbol constellation is adjusted from a target symbol constellation such that the generated modulation symbols pre-compensate for the distortion effects,
wherein the modulator is further configured to select the adjusted symbol constellation from a set of symbol constellations based on an operating point of a power amplifier (PA), and
wherein the DPD is further configured to:
generate the pre-distorted symbols from the modulation symbols using a pre-distortion function to further pre-compensate for the distortion effects; and
update the pre-distortion function such that a difference between the transmission symbols and a scaled version of the target symbol constellation is reduced.

9. The BS of claim 8, wherein the modulator is further configured to select the adjusted symbol constellation from the set of symbol constellations based on the operating point of the PA such that the generated modulation symbols pre-compensate for the distortion effects of the PA at that operating point.

10. The BS of claim 8, further comprising:
an envelope tracker (ET) operably coupled to the DPD, the modulator, and the PA, the ET configured to determine an updated operating point for the PA based on the pre-distorted symbols,
wherein the modulator is further configured to select the adjusted symbol constellation based on the updated operating point and generate the modulation symbols for the updated operating point such that they pre-compensate for the distortion effects of the PA at the updated operating point.

11. The BS of claim 10, wherein:
the DPD is further configured to generate the pre-distorted symbols for the updated operating point based on the modulation symbols for the updated operating point, and
the ET is further configured to determine a supply voltage for the PA based on the pre-distorted symbols for the updated operating point.

12. The BS of claim 8, wherein:
the pre-distortion function is a generalized memory polynomial (GMP) model, and
the DPD is configured to update coefficients of the GMP model such that the difference between the transmission symbols and the scaled version of the target symbol constellation is reduced.

13. The BS of claim 8, wherein:
the distortion effects of the PA comprise nonlinear effects and memory effects,
the adjusted symbol constellation at least partially pre-compensates for the nonlinear effects, and
the pre-distortion function pre-compensates for at least the memory effects.

14. The BS of claim 8, wherein the adjusted symbol constellation is generated such that a loss function between the transmission symbols and the scaled version of the target symbol constellation is reduced.

15. A method of operation of a user equipment (UE), comprising:
generating modulation symbols from input bits according to an adjusted symbol constellation;

generating pre-distorted symbols from the modulation symbols; and amplifying the pre-distorted symbols using a power amplifier (PA) to generate transmission symbols that include distortion effects of the PA, wherein the adjusted symbol constellation is adjusted from a target symbol constellation such that the generated modulation symbols pre-compensate for the distortion effects, wherein the pre-distorted symbols are generated from the modulation symbols using a pre-distortion function to further pre-compensate for the distortion effects, wherein the modulator is further configured to select the adjusted symbol constellation from a set of symbol constellations based on an operating point of a power amplifier (PA), and wherein the method further comprises updating the pre-distortion function such that a difference between the transmission symbols and a scaled version of the target symbol constellation is reduced.

16. The method of claim 15, further comprising selecting the adjusted symbol constellation from the set of symbol constellations based on the operating point of the PA such that the generated modulation symbols pre-compensate for the distortion effects of the PA at that operating point.

17. The method of claim 15, further comprising:
determining, using an envelope tracker (ET), an updated operating point for the PA based on the pre-distorted symbols; and
selecting the adjusted symbol constellation based on the updated operating point and generating the modulation symbols for the updated operating point such that they pre-compensate for the distortion effects of the PA at the updated operating point.

18. The method of claim 17, further comprising:
generating the pre-distorted symbols for the updated operating point based on the modulation symbols for the updated operating point; and
determining, using the ET, a supply voltage for the PA based on the pre-distorted symbols for the updated operating point.

19. The method of claim 15, wherein:
the pre-distortion function is a generalized memory polynomial (GMP) model, and
the method further comprises updating coefficients of the GMP model such that the difference between the transmission symbols and the scaled version of the target symbol constellation is reduced.

20. The method of claim 15, wherein the adjusted symbol constellation is generated such that a loss function between the transmission symbols and the scaled version of the target symbol constellation is reduced.

* * * * *